US011567824B2

(12) United States Patent
Saha et al.

(10) Patent No.: US 11,567,824 B2
(45) Date of Patent: Jan. 31, 2023

(54) RESTRICTING USE OF SELECTED INPUT IN RECOVERY FROM SYSTEM FAILURES

(71) Applicant: INTERNATIONAL BUSINESS MACHINES CORPORATION, Armonk, NY (US)

(72) Inventors: Chanchal Saha, Beacon, NY (US); Kanayo George Okonji, Wappingers Falls, NY (US); Richard Burton Finch, New Paltz, NY (US); Jeffrey Willoughby, Poughkeepsie, NY (US); Marc Henri Coq, Hopewell Junction, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 17/122,602

(22) Filed: Dec. 15, 2020

(65) Prior Publication Data

US 2022/0188181 A1    Jun. 16, 2022

(51) Int. Cl.
*G06F 11/00* (2006.01)
*G06F 11/07* (2006.01)
*G06N 5/02* (2006.01)
*G06F 9/48* (2006.01)

(52) U.S. Cl.
CPC ........ *G06F 11/0793* (2013.01); *G06F 9/4881* (2013.01); *G06F 11/0721* (2013.01); *G06N 5/02* (2013.01)

(58) Field of Classification Search
CPC ............ G06F 11/0793; G06F 11/0721; G06F 11/0781; G06F 11/0706; G06F 11/1402; G06F 11/142
See application file for complete search history.

(56) References Cited

U.S. PATENT DOCUMENTS

| | | |
|---|---|---|
| 7,730,364 B2 | 6/2010 | Chang et al. |
| 7,779,349 B2 | 8/2010 | Spangler |
| 8,205,173 B2 | 6/2012 | Wu et al. |
| 10,120,912 B2 | 11/2018 | Shah-Hosseini |
| 10,338,993 B1 | 7/2019 | Lekivetz et al. |

(Continued)

OTHER PUBLICATIONS

Mell, Peter and Tim Grance, "The NIST Definition of Cloud Computing," National Institute of Standards and Technology, Information Technology Laboratory, Special Publication 800-145, Sep. 2011, pp. 1-7.

(Continued)

*Primary Examiner* — Katherine Lin
(74) *Attorney, Agent, or Firm* — Tihon Poltavets, Esq.; Blanche E. Schiller, Esq.; Heslin Rothenberg Farley & Mesiti P.C.

(57) ABSTRACT

Restricting use of a selected input in recovery from system failures. A testing system obtains, based on failure of a system, an indication of one or more tasks to be performed. The testing system automatically determines whether a user is to perform one or more actions to alter execution of the one or more tasks. The automatically determining is based on an indication of whether a knowledge transfer score of the user meets at least one predefined criterion. Based on knowledge transfer score meeting the at least one predefined criterion, the one or more actions are performed.

20 Claims, 21 Drawing Sheets

K(i), D(i), W(i) values

| Activity No. | K(i) ( 0 or 1 ) | Detractor (D) | | | | | | | | |
|---|---|---|---|---|---|---|---|---|---|---|
| | | 1 | 2 | 3 | 4 | 5 | 6 | 7 | 8 | 9 |
| | | Network Status | Floor Cntl Sys Status | Operation Time | Operator Availability | MTTF for PN | FRU Quality Index | RPA Status | Test Mgt Sys Status | TA BOT Status |
| | D (i) (0 - 100) | 42 | 16 | 15 | 13 | 16 | 18 | 7 | 10 | 4 |
| 1 | Request parts using floor control system | 1 | 1 | 1 | 0 | 1 | 1 | 1 | 1 | 1 |
| 2 | Check status to pick up the part | 1 | 1 | 1 | 1 | 1 | 0 | 1 | 0 | 1 |
| 3 | Replace defective PN PN1 with new PN PN10 | 1 | 0 | 0 | 0 | 1 | 0 | 0 | 0 | 1 |
| 4 | Complete visual inspection | 1 | 0 | 0 | 1 | 0 | 0 | 0 | 0 | 1 |
| 5 | Reboot system | 1 | 1 | 0 | 0 | 0 | 0 | 0 | 0 | 1 |
| 6 | Restart Test Mgt System Window | 1 | 0 | 0 | 0 | 0 | 0 | 0 | 1 | 1 |
| 7 | Regression test operation in Test Mgt Sys | 1 | 0 | 1 | 1 | 0 | 0 | 0 | 1 | 1 |
| 8 | Record repair process | 1 | 0 | 0 | 0 | 0 | 0 | 0 | 0 | 1 |

$$T = F1 - \frac{\sum_{i=1}^{I} K_i \times W_i \times D_i}{I}$$

(56) References Cited

U.S. PATENT DOCUMENTS

| | | |
|---|---|---|
| 10,761,974 B2 | 9/2020 | Hoover et al. |
| 2008/0127089 A1* | 5/2008 | Peretz .................... G06Q 10/06 717/122 |
| 2017/0242784 A1 | 8/2017 | Heorhiadi et al. |
| 2017/0262360 A1 | 9/2017 | Kochura et al. |
| 2019/0146901 A1 | 5/2019 | Hoover et al. |

OTHER PUBLICATIONS

Sabbagh, Ramin et al., "A Framework Based on K-Means Clustering and Topic Modeling for Analyzing Unstructured Manufacturing Capability Data," Journal of Computing and Information Science in Engineering, vol. 20, Mar. 2020, pp. 011005-1 thru 011005-13.

Madan, Neeraj et al., "Cognitive Test Advisor Facility for Identifying Test Repair Actions," U.S. Appl. No. 16/744,649, filed Jan. 16, 2020, pp. 1-68.

Saha et al., "A Decision Support System for Real-Time Order Management in a Heterogeneous Production Environment", Expert Systems with Applications, vol. 50, Oct. 2015 (22 pages).

\* cited by examiner

Dynamic Technical Dictionary Data Structure

| Technical Words | Alternate Words | Relationship Strength* |
|---|---|---|
| Node 702 | complex 704 | .75 706 |
| Node | frame | .92 |
| Node | drawers | .90 |
| Node | book | .95 |

\* Relationship Strength = Combination Strength Score + Reinforcement Learning Score Where:
- Combination strength score is determined using natural language processing keyword search matching algorithm
- Reinforcement Learning Score is determined using Hierarchal Reinforcement Learning algorithm

Expand search horizon for querying manufacturing test data from user inputs

| User inputs | Error Error code in modul XYZ re-code failure 800 | |
|---|---|---|
| Method | Example | How |
| Translate non-English word & error | Replace "*Eror Error code in modul XYZ re-code failure*" into "*Error Error code in module XYZ re-code failure*" 802 | Auto-correct & translator for pattern recognition |
| Categorize key words for extensive search | Technical words: re-code, module, Error code<br>English words: error, failure<br>Assembly/subassembly words: XYZ | Find minimal critical inputs to query data |

| Method | Extracted key words | Synonyms/Alternatives | How | Output (tag clouds) 804 |
|---|---|---|---|---|
| Translate non-English word & error | Error code, re-code, module | Code, symbol, Sub-assembly, drawer, book, consoles | Find meaning of technical words from 'dynamic technical dictionary' that has relationship strength score > X | Tag clouds<br>1. Console, Error code<br>2. Code, recode, re-code, symbol<br>3. module, book, drawers |
| English words | error, failure | Mistake, fault, typo, failing, not working, crush | Find synonyms from dictionary | 4. error, mistake, fault,<br>5. failing, not working, crush |
| Assembly/subassembly related words | XYZ | XYZa, XYZb | Find parts history for sub-assemblies or alternative parts | 6. XYZ, XYZa, XYZb |

| Final outputs | Extracted data from databases using additional contents for the tag clouds (right most column) |
|---|---|

FIG. 8

Steps for Dynamic Dictionary Content Management: ⎯920

| Error Code ⬇ | Error Message |
|---|---|
| ⊟ Err15 | Found 1 errors on the problem log on 02. Please use Console to solve and CLOSE them.<br>Found 1 errors on the problem log on 03. Please use Console to solve and CLOSE them.<br>Found 1 errors on the problem log on 04. Please use Console to solve and CLOSE them.<br>Found 1 errors on the problem log on 04. Please use Console to solve and CLOSE them.<br>Found 1 errors on the problem log on 05. Please use Console to solve and CLOSE them.<br>Found 1 errors on the problem log on 06. Please use Console to solve and CLOSE them.<br>Found 1 errors on the problem log on 10. Please use Console to solve and CLOSE them.<br>Found 1 errors on the problem log on 10. Please use Console to solve and CLOSE them.<br>Found 1 errors on the problem log on 06. Please use Console to solve and CLOSE them.<br>Found 1 errors on the problem log on 10. Please use Console to solve and CLOSE them. |

922⎯

| Error Code ⬇ |
|---|
| ⊟ Err15 |
| ⊟ Err42 |
| ⊟ Err101 |
| ⊟ Err02 |
| ⊟ Err12 |

Dynamic Technical Dictionary Data Structure

| Error Code ⬇ | Reference Code | Relationship_Strength |
|---|---|---|
| ⊟ Err15 | 02 | 1.00 |
| ⊟ Err42 | 02 | 0.75 |
| ⊟ Err101 | 02 | 0.25 |
| ⊟ Err02 | 02 | 0.25 |
| ⊟ Err12 | 02 | 0.25 |

⎯924

Solution Priority List ⎯926

| MORE DETAILS FIX | SUCCESS RATE |
|---|---|
| REPLACE AS PER ADVISE C39 (DIMM CDIMM 32G8 MEM Module A) | 61.21 |
| REPLACE Module B (DIMM CDIMM 64G8 MEM Module 3) | 61.21 |
| REGRESS TEST (DIMM CDIMM 32G8 MEM Module 4) | 48.98 |
| RETRY (DIMM CDIMM 32G8 MEM) | 36.73 |
| RETRY (DIMM CDIMM 64G8 2U) | 34.68 |
| RESEATED AAA DIMM AND RETRY | 30.61 |

FIG. 9B

- Example: for a test failure, provides a repair recommendation (i) as "Retry XX00YYY DIMM CD/MM 32 GB MEM"
  - User's (k) feedback ($r_i$) for that repair recommendation at various times:

| Time (t) | User (K) | Feedback | Reward/Penalty ($r_i$) |
|---|---|---|---|
| Now (t = 1) | Test Lead | Good | 0.5 |
| 1 month ago (t = 2) | Test Lead | Good | 0.5 |
| 2 month ago (t = 3) | Test Engineer | Alright | 0 |
| Now (t = 1) | Test Tech | Bad | -0.5 |
| Now (t = 1) | Test Engineer | Excellent | 1 |

FIG. 10C

Weight Matrix

| Recommendation (i) | Person (K) | Weight ($w_{ik}$) |
|---|---|---|
| Retry XX00YYY DIMM CD/MM 32 GB MEM | Test Engineer | 1 |
| | Test Lead | 0.80 |
| | Test Tech | .70 |
| | Others | 0.5 |
| Retry XX00YYY DIMM CD/MM 64 GB MEM | Test Engineer | 1 |
| | Test Lead | 0.80 |
| | Test Tech | .70 |
| | Others | 0.5 |

FIG. 10D

Reward/Penalty ($r_i$) Matrix

| Feedback | Reward/Penalty ($r_i$) |
|---|---|
| Excellent | 1 |
| Good | 0.5 |
| Alright | 0 |
| Bad | -0.5 |
| Too bad | -1 |

FIG. 10E

Hierarchical Reinforcement Learning Score, $Z_i$ = Retry XX00YYY DIMM CD/MM 32 GB MEM

| t | γ | r (i) | w (ik) | Z(i,t) |
|---|---|---|---|---|
| 1 | 0.8 | 0.5 | 0.8 | 0.320 |
| 2 | 0.8 | 0.5 | 0.8 | 0.256 |
| 3 | 0.8 | 0 | 1 | 0.000 |
| 4 | 0.8 | -0.5 | 0.7 | -0.143 |
| 5 | 0.8 | 1 | 1 | 0.328 |
| | | | Z(i) | 0.760 |

FIG. 10F

K(i), D(i), W(i) values

| Activity No. | K(i) ( 0 or 1 ) | Detractor (D) | | | | | | | | |
|---|---|---|---|---|---|---|---|---|---|---|
| | | 1 | 2 | 3 | 4 | 5 | 6 | 7 | 8 | 9 |
| | | Network Status | Floor Cntl Sys Status | Operation Time | Operator Avail-ability | MTTF for PN | FRU Quality Index | RPA Status | Test Mgt Sys Status | TA BOT Status |
| | D (i) (0 - 100) | 42 | 16 | 15 | 13 | 16 | 18 | 7 | 10 | 4 |
| 1 | Request parts using floor control system | 1 | 1 | 1 | 0 | 1 | 1 | 1 | 1 | 1 |
| 2 | Check status to pick up the part | 1 | 0 | 1 | 1 | 1 | 0 | 1 | 0 | 1 |
| 3 | Replace defective PN PN1 with new PN PN10 | 1 | 0 | 0 | 0 | 1 | 0 | 0 | 0 | 1 |
| 4 | Complete visual inspection | 1 | 0 | 0 | 1 | 0 | 0 | 0 | 0 | 1 |
| 5 | Reboot system | 1 | 1 | 0 | 0 | 0 | 0 | 0 | 0 | 1 |
| 6 | Restart Test Mgt System Window | 1 | 0 | 1 | 1 | 0 | 0 | 0 | 1 | 1 |
| 7 | Regression test operation in Test Mgt Sys | 1 | 0 | 0 | 0 | 0 | 0 | 0 | 1 | 1 |
| 8 | Record repair process | 1 | 0 | 0 | 0 | 0 | 0 | 0 | 0 | 1 |

$$T = F1 - \frac{\sum_{i=1}^{I} K_i \times w_i \times D_i}{I}$$

FIG. 12A

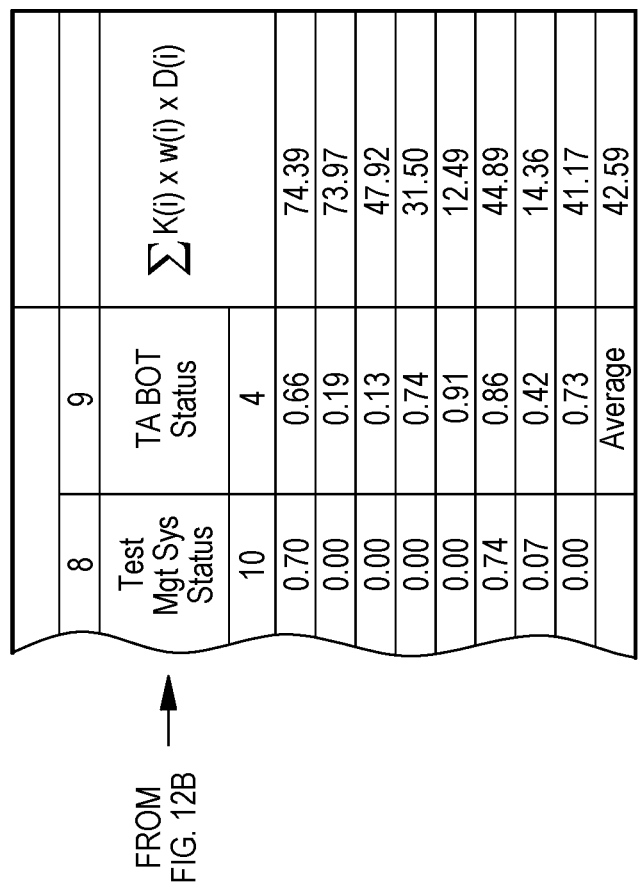

RESTRICTING USE OF SELECTED INPUT IN RECOVERY FROM SYSTEM FAILURES

BACKGROUND

One or more aspects relate, in general, to information technology systems, and in particular, to cognitive test environments for identifying and resolving failures of information technology systems.

An extensive test process phase is performed during the manufacturing of information technology systems and/or at other times to ensure that the systems will perform as expected when in a production environment. The testing ensures the reliability, accessibility, functionality and/or security of a system.

Some failures during testing are trivial, while others are extensive requiring complex analysis, which takes time and slows down the test process. This inevitably impacts availability of the system in production.

SUMMARY

Shortcomings of the prior art are overcome, and additional advantages are provided through the provision of a computer-implemented method. The computer-implemented method includes obtaining, by a testing system based on a system failure, an indication of one or more tasks to be performed. A determination is automatically made, by the testing system, of whether a user is to perform one or more actions to alter execution of the one or more tasks. The automatically determining is based on an indication of whether a knowledge transfer score of the user meets at least one predefined criterion. Based on the knowledge transfer score meeting the at least one predefined criterion, the one or more actions are performed.

Computer systems and computer program products relating to one or more aspects are also described and claimed herein. Further, services relating to one or more aspects are also described and may be claimed herein.

Additional features and advantages are realized through the techniques of the present invention. Other embodiments and aspects of the invention are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of aspects of the invention are apparent from the following detailed description taken in conjunction with the accompanying drawings in which:

FIG. 7 depicts one embodiment of a dynamic technical dictionary data structure for use by a cognitive test advisor facility, and illustrating technical word relationship strength scores determined, at least in part, via a reinforcement learning score, in accordance with one or more aspects of the present invention;

FIG. 8 depicts an operational example of the cognitive test advisor facility processing of FIG. 6, where an expanded search input, such as expanded search input tag clouds, is generated for use in searching one or more test failure databases, in accordance with one or more aspects of the present invention;

FIG. 9B depicts an example process for deriving recommendations for a test failure using a dynamic technical dictionary data structure and reinforcement learning, in accordance with one or more aspects of the present invention;

FIG. 10C depicts one embodiment of a feedback data structure which includes user feedback on a repair action recommendation provided and tried at different times, for use in hierarchical reinforcement learning processing, in accordance with one or more aspects of the present invention;

FIG. 10D depicts one embodiment of a weight ($w_{ik}$) matrix for use in hierarchical reinforcement learning processing, in accordance with one or more aspects of the present invention;

FIG. 10E depicts one embodiment of a reward/penalty ($r_i$) matrix for use in hierarchical reinforcement learning processing, in accordance with one or more aspects of the present invention;

FIG. 10F depicts one embodiment of a learning score data structure depicting hierarchical reinforcement learning scores for the users' feedback on the repair action recommendation provided, and tried, at various times, in accordance with one or more aspects of the present invention;

FIGS. 12A-12C depict a numerical example of calculating a knowledge transfer score to be used in the processing to restrict use of a selected input, in accordance with one or more aspects of the present invention;

DETAILED DESCRIPTION

Figure 1:
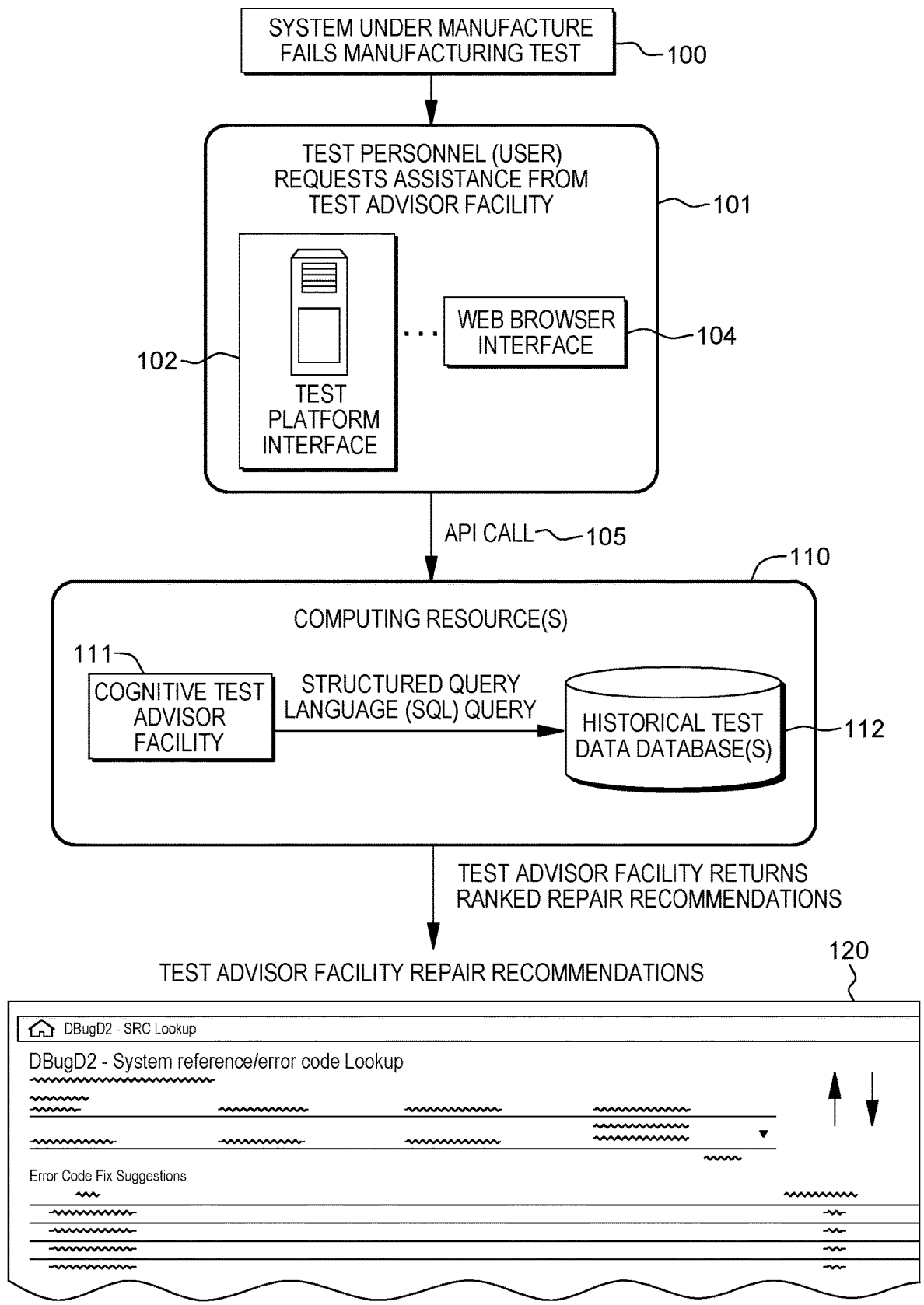
FIG. 1 depicts one embodiment of a process for identifying, by a cognitive test advisor facility, one or more potential test repair actions for a test failure, in accordance with one or more aspects of the present invention.

In accordance with one or more aspects of the present invention, a test advisor facility is provided that performs cognitive test advisor facility processing based on a failure of a system, such as an information technology system being manufactured. The cognitive test advisor facility processing restricts, in accordance with an aspect of the present invention, a selected input in the processing allowing the facility to control the processing, increasing performance and potentially reducing errors. In one example, the selected input is a user's input, including knowledge transfer, with respect to one or more aspects of recovery from a failure. The user's input is restricted, for instance, as the cognitive test advisor facility gains knowledge relating to the failure or type of failure. As an example, a knowledge transfer score is determined, and if the knowledge transfer score has a predefined relationship (e.g., less than or equal) to a threshold, then the user's input is taken into consideration. For instance, one or more actions are performed, such as modifying an activity execution sequence of a plurality of tasks and/or altering selection of a task performing agent. Various other actions may also be performed, either in addition to and/or in lieu of, alteration of the activity execution sequence and/or the task performing agent selection.

In one or more aspects, a dynamic decision-making and learning technique is provided that is based on a user's knowledge transfer for, e.g., the activity sequencing and/or performing agent selection by adoption of the user's cognitive experience. In one embodiment, for a failure-action pair recommendation proposed by a machine learning algorithm, one or more aspects have the ability to restrict on the cognitive learning based on the knowledge transfer score and knowledge transfer threshold indices. The knowledge transfer score is a determining factor on the ability of the computer-based system to autonomously perform one or more actions and/or alter execution of one or more actions without any user (e.g., human) intervention.

Throughout this description, the terms test advisor facility, facility, test advisor tool, test advisor, test advisor system, testing system, cognitive test advisor facility and cognitive machine learning tool and system are used interchangeably to refer to certain aspects of the present invention that perform various operations, functions, and the like. As the terms are used herein, the test advisor facility, tool and system can be an implementation of the functions or aspects of the illustrative embodiments in the form of an apparatus, a procedure, or a computer program product. In the case of a procedure, the procedure is implemented by one or more devices, apparatuses, computers, data processing systems, or the like. In the case of a computer program product, the logic represented by computer code or instructions embodied in or on the computer program product is executed by one or more hardware devices in order to implement the functionality to perform the operations associated with the specific facility. Thus, the facility described herein can be implemented as specialized hardware, software executing on general purpose hardware, software instructions stored on a medium such that the instructions are readily executable by specialized or general purpose hardware, a procedure or method for executing the functions, etc., or a combination of any of the above.

In one or more aspects, the cognitive test advisor facility analyzes structured and unstructured data to more quickly determine possible test failure repair actions. In one embodiment, the facility performs data analytics on previously run tests, planned tests, failure information, and user feedback data to determine one or more best-possible repair actions to take, based on a particular test failure.

One or more embodiments provide a test advisor facility that resolves manufacturing systems test failures by analyzing test failures and recommending a next best action(s) via one or more machine learning processes. In some embodiments, this includes the ability to identify and propose best possible test repair actions based on historical data and cognitive learning capability relating to a particular detected quality problem. Cognitive machine learning can be used to identify root causes or symptoms over time for each test failure. In this manner, similar test failures can be automatically assessed and resolved based on previous test results and on feedback stored in a data repository. In some embodiments, several variables can be accounted for in the allocation of a repair part when resolving a particular problem. In some embodiments, the variables include part availability, the cycle time for the repair, quality hold, and a client requested ship date. Each of the variables can be weighted within a multi-criteria decision making algorithm that maximizes and prioritizes which repair actions should be completed to optimize the overall manufacturing process. In some embodiments, the test plan is automatically re-sequenced to bypass test steps that are impacted by the test failure. For example, in some embodiments, rather than simply stopping the test plan pending a repair action, other test steps of the test plan, that are not impacted by the defect part are executed in parallel while a repair action part is being identified and obtained.

Guidance can be provided through machine learning to dynamically adjust the test plan based on previous experience. In some embodiments, corrective action is performed automatically without the need of interaction by a test operator. For example, a new micro-code update or an automatic re-run of test cases (or sequencing) can be generated using machine learning and experience. In some embodiments, structured and unstructured test result data and defect records are utilized to establish relationships or screens between test steps and root causes, in which the relationships indicate the test steps that are likely to fail in the presence of a particular root cause. The established relationship knowledgebase can then be expanded to take into account multiple root causes. In some embodiments, the relationship knowledge can be modified based on current test results or on new information via one or more cognitive engines for machine learning.

In addition, it is recognized herein that test processes generate an enormous amount of data that can be stored in multiple locations and multiple formats. In one or more embodiments, the cognitive test advisor facility reduces the time required to isolate and repair a failing system or machine. Less time spent de-bugging and analyzing a failure allows, for instance, additional time to be spent repairing herein enhancing test processing by reducing test cycle time and improving product quality.

Yet further, in accordance with one or more aspects, the test advisor facility includes dynamic knowledge transfer processing that dynamically determines using a knowledge transfer score whether a particular recovery task is to be modified by a user to facilitate recovery. This processing restricts a user's input based on the knowledge transfer score having a predefined relationship with one or more knowledge transfer thresholds, allowing the test advisor facility to control certain actions to be taken, without selected input (e.g., selected user input). This aspect, as well as other aspects of the test advisor facility, are further described herein.

FIG. 1 depicts one embodiment of a test failure processing flow using a cognitive test advisor facility, where initially, a system under manufacture, such as a computing system, server, device, machine, etc., fails a manufacturing test 100. (In other embodiments, the system fails a test other than during manufacturing.) Based on the test failure, test personnel request assistance 101 from the cognitive test advisor facility through, for instance, a test platform interface 102, a web browser interface 104, etc. In one embodiment, an application program interface (API) call 105 is made to a cognitive test advisor facility 111 implemented, in one or more embodiments, as program code executing on one or more computing resources 110. Program code, as referred to herein, can include both software and hardware. For instance, program code in certain embodiments can include fixed function hardware, while other embodiments can utilize a software-based implementation of the functionality described. Certain embodiments combine both types of program code.

In one embodiment, a common application programming interface call can be used across multiple test platforms, if desired. Cognitive test advisor facility 111 processes a user input or input request with reference to one or more databases 112 of historical test data for the manufacturing process. One or more databases 112 of historical test data can be associated with computing resource(s) 110, as shown, or accessible by computing resource(s) 110 across a network. As explained, cognitive test advisor facility 111 returns, in one or more embodiments, suggested test repair actions, which can be ranked repair recommendations that are presented, such as via a graphical user interface (GUI) 120, on a display. One or more of the suggested repair actions are then used by the user, or by the test advisor facility itself directly (depending on the recommendation), to make a repair or an adjustment, such as to the manufacturing process, to address the test failure.

In one or more embodiments, the cognitive test advisor facility is configured to generate test plans based on test failure root causes and/or symptoms. In one or more embodiments, the facility analyzes structured and unstructured data using machine learning processes to determine the best possible test failure repair action recommendation(s), based on user input. Further, in one or more embodiments, solutions to several challenges when querying unstructured data for failure analysis and prioritizing recommendations for repair actions are provided. For example, one challenge is that unstructured data is being queried from databases based on a user-provided input. Thus, in one embodiment, the user input is analyzed and expanded herein, for instance, for non-exact-matched words, spelling errors, technical word data, non-technical word data (e.g., English data), part-related data, etc. Further, another challenge is that a graphical user interface of recommended repair actions for an incident can show multiple recommendations, even though the English meaning of two or more different recommendations in the list may be the same, which can be due to the machine learning processes not understanding the true meaning of the recommendations. Another challenge for the cognitive test advisor facility is to determine relevant and meaningful weights for each queried data record with respect to the user input and/or provided feedback on success or failure of prior repair action recommendations.

In accordance with one or more aspects, a cognitive test advisor facility is provided, which includes, in part, processing to create expanded search queries of manufacturing test data based on user input; to propose recommendations for repair actions that are meaningful, and different from one another; and to provide expanded search input by finding content for identified tag clouds using multiple word/data dictionaries.

In one or more embodiments, the cognitive test advisor is a computer-based facility, tool or system. The computer facility can execute on and/or include one or more processors, for instance, central processing units (CPUs). The processor(s) can include functional components used in the execution of program code, such as functional components to fetch program code from a location, such as cache or main memory, decode program code, and execute program code, access memory for instruction execution, and write results of the executed instructions or code. A processor(s) can also include a register(s) to be used by one or more of the functional components. In one or more embodiments, the computing resource(s) can include memory, input/output, a network interface, and storage, which can include and/or access one or more databases, such as discussed herein. The components of the computing environment can be coupled to each other via one or more buses and/or other connections. Bus connections can be one or more of any of several types of bus structures, including a memory bus or a memory controller, a peripheral bus, an accelerated graphics port, and a processor or local bus, using any of a variety of bus architectures. By way of example, and not limitation, such architectures can include the Industry Standard Architecture (ISA), the Micro-Channel Architecture (MCA), the Enhanced ISA (EISA), the Video Electronic Standard Association (VESA) local bus, and the Peripheral Component Interconnect (PCI). Example computing environments or computer systems which can implement one or more aspects are described further below with reference to FIGS. 2 & 14-16.

Figure 2:
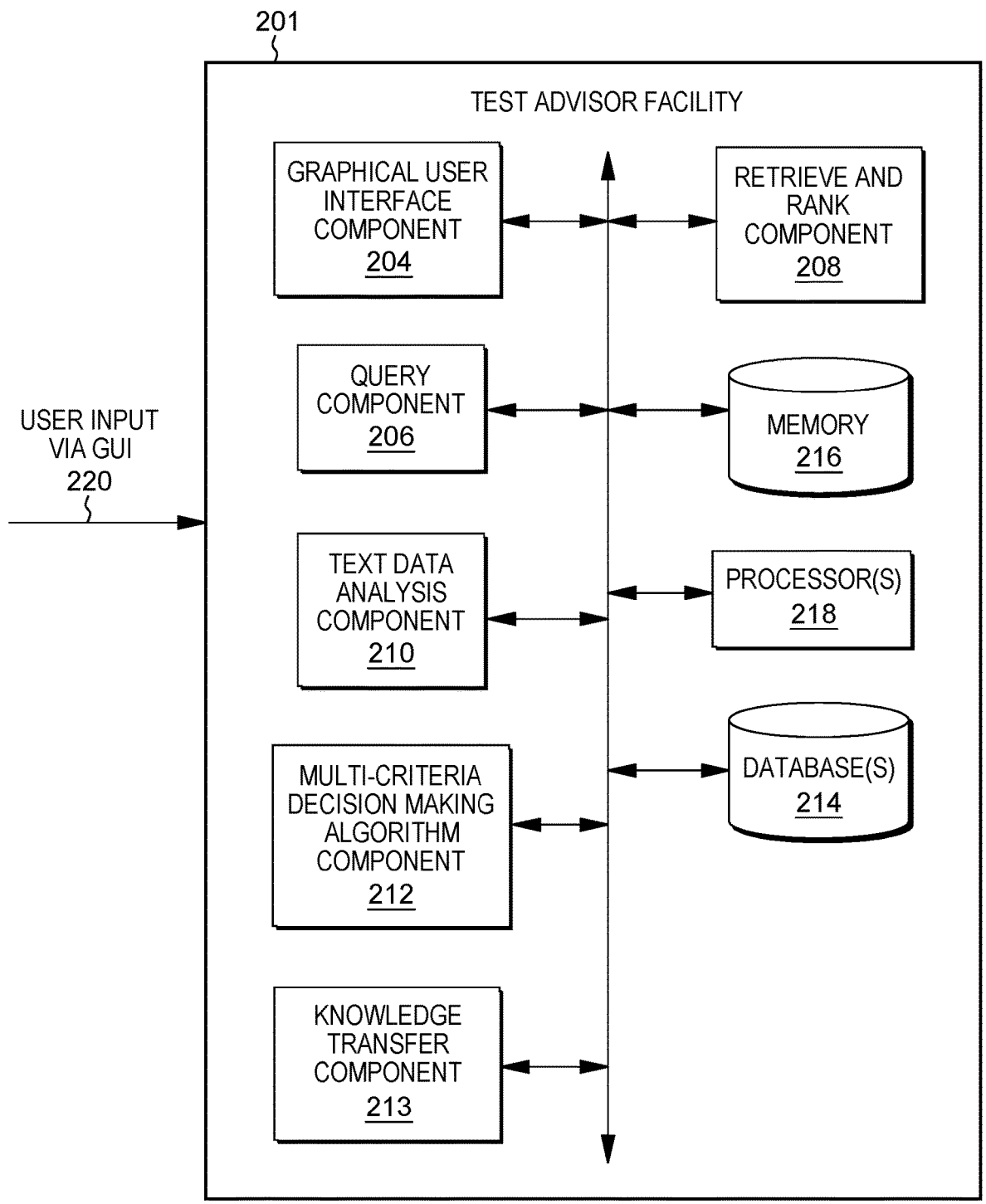
FIG. 2 depicts one embodiment of a cognitive test advisor facility, in accordance with one or more aspects of the present invention.

FIG. 2 depicts an example of a computer system 200 to implement one or more aspects of the present invention, in accordance with one or more embodiments. In one implementation, system 200 is a machine learning system that can be utilized to solve a variety of technical issues (e.g., learning previously unknown functional relationships) in connection with technologies such as, but not limited to, machine learning technologies, data analytics technologies, data classification technologies, data clustering technologies, recommendation system technologies, signal processing technologies, manufacturing defect and analysis technologies, and/or other digital technologies. System 200 employs hardware and/or software to solve problems that are highly technical in nature, that are not abstract and that cannot be realistically performed as a set of mental steps.

In certain embodiments, some or all of the processes performed by system 200 are performed by one or more specialized computers (e.g., one or more specialized processing units, a specialized computer with a text data analysis component, etc.) for carrying out defined tasks related to machine learning. In some embodiments of the present invention, system 200 and/or components of the system can be employed to solve problems that arise through advancements in technologies such as mentioned herein.

In the example shown in FIG. 2, system 200 includes a test advisor facility 201 (or testing system) that includes one or more components (or engines), including, for instance, a graphic user interface component 204, a query component 206, a retrieve and rank component 208, a text data analysis component 210, a multi-criteria decision making algorithm component 212, a knowledge transfer component 213 and one or more databases 214. In one or more embodiments, test advisor facility 201 includes additional, fewer and/or other components. Many variations are possible.

In some embodiments, test advisor facility 201 constitutes a machine-executable component(s) embodied within a machine(s) (e.g., embodied in one or more computer readable mediums (or media) associated with one or more machines). Such component(s), when executed by the one or more machines, (e.g., computer(s), computing device(s), virtual machine(s), etc.) cause the machine(s) to perform the operations described. In some embodiments, test advisor facility 201 includes a memory 216 that stores computer executable components and instructions. Furthermore, test advisor facility 201 in some embodiments includes one or more processors 218 to facilitate execution of the instructions (e.g., computer executable components and corresponding instructions) by test advisor facility 201. As shown, graphical user interface component 204, query component 206, retrieve and rank component 208, text data analysis component 210, multi-criteria decision making algorithm component 212, knowledge transfer component 213, database(s) 214, memory 216, and/or processor(s) 218 are operatively coupled to one another in one or more embodiments. Again, in other embodiments, test advisor facility 201 includes additional, fewer, and/or other components and/or aspects.

In general, in one or more embodiments, test advisor facility 201 is a cognitive-based tool that is capable of diagnosing a root cause and/or symptom(s) of manufacturing test failures (and/or other test failures) and then recommending one or more corrective course of actions based on structured and unstructured data that is associated with the test failure. In some embodiments, test advisor facility 201 determines one or more test failure repair action(s), e.g., the best possible test failure repair action(s)) for a detected test failure (e.g., manufacturing test failure) by, for example, analyzing data on previously run system tests (e.g., manufacturing systems tests), planned tests, failure information, and/or user feedback data on prior recommended repair actions. Test advisor facility 201 provides, in one embodiment, a heat map that indicates which steps are more likely to cause a failure or be related to a particular symptom. In the context of a test failure, test advisor facility 201, in some embodiments, generates suggested possible repair actions in response to a user interaction with a heat map presented on a graphical user interface. For example, in some embodiments, possible repair actions are provided when a user hovers over the heat map with a mouse cursor or contacts a touch screen of the computer, based on which the suggested action(s) are then provided with supporting keywords. In some embodiments, the graphic user interface provides prioritized recommendations (based on the user input) for repair actions, for instance, repair cycle time for each recommendation. The graphical user interface can also attach test logs to support a recommendation and to assist test technicians.

In order to resolve a test failure, a root cause and/or one or more corrective actions are ascertained. In general, to analyze and resolve test failures, test advisor facility 201, in certain embodiments, identifies certain attributes that are characteristic of a test failure and repair actions that are associated with the test failure via a machine learning service, such as for example, through the use of the IBM Watson® system. IBM and IBM Watson are registered trademarks of International Business Machines Corporation in at least one jurisdiction.

In one embodiment, a graphical user interface is generated that allows a test technician to find test failures during a test process, in which the user is able to provide a set of attributes and a user comment to the system via the graphical user interface (i.e., a user input). In some embodiments, the attributes can include a combination of any of brand, machine type, machine model, commodity, modifier, defect code, operation number, operation step, and user comment fields, as examples. Test advisor facility 201 in certain embodiments is configured to utilize machine learning application programming interfaces and/or services (e.g., IBM Watson application programming interfaces/services, such as a Watson Discovery service and/or a Watson Natural Language Understanding service, that are provided by International Business Machines Corporation), and optionally, one or more multi-criteria decision making algorithm(s) to identify one or more best possible solutions, as discussed herein.

Figure 4:
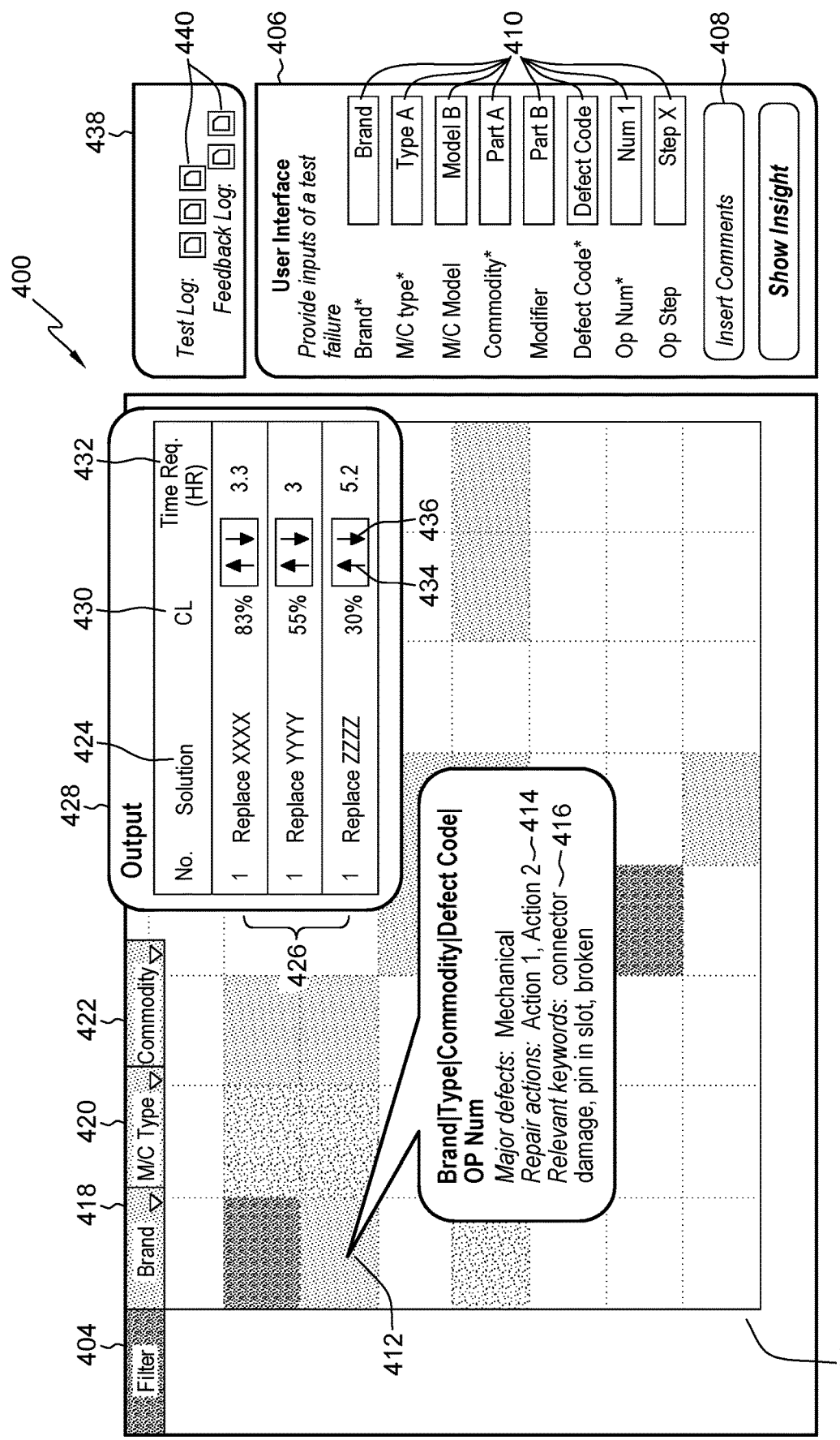
FIG. 4 depicts one embodiment of a graphical user interface depicting an example solution priority list of suggested test repair actions provided by a cognitive test advisor facility, in accordance with one or more aspects of the present invention.

Graphical user interface component 204 of test advisor facility 201 is configured, in one or more embodiments, to generate a heat map pertaining to manufacturing process test failures, in which the heat map is based at least in part on historical test failures and prior repair actions. The heat map can be presented to a user via a graphical user interface that is generated by graphical user interface component 204. After the heat map is generated, test advisor facility 201 could receive a user input 220 via the graphical user interface regarding a test failure of a manufacturing process. In some embodiments, the graphical user interface generated by graphical user interface component 204 has multiple windows and/or views. FIG. 4 depicts an example graphical user interface 400 in accordance with one or more embodiments.

As shown in FIG. 4, in some embodiments, graphical user interface 400 includes a heat map 402 that is presented in graphical user interface 400 via a first window and/or view 404. Heat map 402 includes a grid including a plurality of color-coded or shaded cells. In some embodiments, each color-coded cell of the plurality of color-coded cells is associated with a different respective operation number and defect code pair. In some embodiments, graphical user interface 400 includes a second window and/or view 406 that is configured to receive an input from a user (e.g., graphical user interface input 220 (FIG. 2)). The input can include various attributes pertaining to a detected test failure of a manufacturing process that are entered by the user via various fields 408, 410. In one or more embodiments, the graphical user interface's second window and/or view 406 includes a user comment field 408 and at least one or more of the following fields 410: a brand, a machine type, a machine model, a commodity, a modifier, a defect code, an operation number, and/or an operation step, as examples. The user input includes structured and unstructured data, in which the structured data includes attributes obtained from the various attribute fields 410, and the unstructured data includes text obtained from user comment field 408. In one or more embodiments, heat map 402 provides a representation that includes, for each operation number defect code pair, frequency of failure occurrence 412, repair actions 414, and relevant keywords 416 that are proposed for a brand 418, machine type 420, and commodity 422. In some embodiments, the frequency of failure occurrence 412 is represented by a color that is indicative of the relative frequency of occurrence of that particular operation number and defect code pair. In some embodiments, the frequency of failure occurrence 412 is additionally or alternatively presented via text.

In one or more embodiments, graphical user interface 400 (e.g., interface component 204 (FIG. 2)) provides a test solution priority list 424 that includes, for instance, one or more suggested test repair actions 426 as identified by the system. In some embodiments, the one or more suggested test repair actions 426 are presented in a window and/or view 428 that is separate and/or distinct from heat map 402. In some embodiments, priority list 424 further includes, for each of the one or more suggested test repair actions 426, a confidence level (CL) 430 and a time required to implement a respective proposed solution 432, as examples.

In some embodiments, a user may provide feedback via graphical user interface 400 regarding the proposed test repair actions that are presented to the user. In some embodiments, the feedback is provided via the clicking or selecting of a selected symbol, such as an arrow up 434 or an arrow down symbol 436. In some embodiments, the feedback is used to gather information from the user regarding whether a repair action that was displayed in the priority list was successful or unsuccessful. For example, an arrow up 434 can be clicked or selected by the user upon identifying that a repair action of the priority list was successful, and an arrow down 436 can be clicked or selected by the user upon identifying that a repair action of the priority list was unsuccessful. The feedback can be incorporated into machine learning (e.g., deep machine learning supervised or unsupervised algorithms) to improve future recommendation results. In some embodiments, graphical user interface 400 further includes a test log window 438. In some embodiments, test log window 438 is a separate and/or distinct view and/or window from heat map 402. In one or more embodiments, test log window 438 includes one or more interactive icons 440 for selecting a particular database for search (e.g., database(s) 214 (FIG. 2)). In one embodiment, the one or more interactive icons 440 include one or more test log selection icons and/or one or more feedback log selection icons. In some embodiments, the graphical user interface 400 provides the user with supporting documents for one or more repair actions that are displayed in the proposed priority list such as, for example, rework instruction(s), reference material(s) or other suitable supporting information.

Returning to FIG. 2, query component 206 is configured to query one or more databases 214 based on the structured and unstructured data that is submitted by the user via the graphical user interface. In some embodiments, query component 206 is configured to query one or more databases 214 to identify test failure and repair action incidents based on input 220 submitted by the user, such as one or more keywords that are extracted from text of the input 220. In some embodiments, database(s) 214 queried by query component 206 include a test log database and/or a defect database. In one or more embodiments, one or more databases 214 additionally or alternatively include a feedback storage database that includes user provided feedback data.

Retrieve and rank component 208 is configured to search for the most relevant test failure records from the queried data and to prioritize the test failure records based on their proximity to user input 220. In some embodiments, retrieve and rank component 208 is configured to utilize a retrieve and rank application programming interface type service to perform the searching, such as for example, the Watson Discovery service and/or the Watson Natural Language Understanding service provided by International Business Machines Corporation. It should be understood that other suitable techniques and/or services offered by International Business Machines Corporation and/or other companies for searching and prioritizing relevant test failure records can be utilized. In some embodiments, retrieve and rank component 208 is configured to search one or more databases 214 for test failure records that are relevant to user input 220 and to prioritize the relevant test failure records via an index score. In one or more embodiments, the index scores are assigned to the relevant test records based at least in part on proximity of the relevant test failure records to user input 220. In some embodiments, retrieve and rank component 208 is configured to detect failure records that have an index score that is higher than a threshold index score, in which the index score is indicative of the similarity and/or proximity of the user input 220 for a particular test failure incident as compared to prior test failures. The proximity can be ascertained using a variety of suitable techniques, such as via clustering techniques, nearest-neighbor techniques, distance vector techniques, and other techniques of similarity or dissimilarity measurement identification. In some embodiments, the search of databases 214 for relevant test failure records is further based at least in part on feedback data that is obtained by querying a feedback storage database (e.g., via query component 206).

Text data analysis component 210 is configured, in one or more embodiments, to analyze text data of records that are identified by retrieve and rank component 208 (e.g., records that have an index higher than a certain threshold value), to find relevant keywords and relevancy rates. The relevant words are those words that have been found in a particular prior test failure. For example, if a certain set of words is often associated with a certain type of test failure, then those words can be relevant to the test failure that is presently being detected by the user. The system associates the relevant keywords with a respective relevancy rate for the given failure occurrence. In some embodiments, text data analysis component 210 utilizes a machine learning engine and/or an application programming interface type service to obtain records from retrieve and rank component 208 that have a retrieve and rank index score that is higher than a certain threshold value. Text data analysis component 210 then analyzes the test data of those obtained records to identify relevant keywords and their respective relevancy rates. For example, in some embodiments, text data analysis component 210 is configured to analyze the unstructured text data of each of the detected failure records to identify relevant keywords and relevancy rates.

Text data analysis component 210 is further configured, in one or more embodiments, to generate a test solution priority list comprising one or more suggested test repair actions for the test failure, in which the list is generated based at least in part on the relevant keywords and the relevancy rates. In some embodiments, text data analysis component 210 is configured to generate the test solution priority list by at least, for each given detected failure record that includes a relevant keyword that has a relevancy rate of the identified relevancy rates that is above a threshold relevancy rate, identifying a test repair action that is stored in the given detected failure record and then counting the frequency of the test repair action across the detected failure records.

In one or more embodiments, based on the proposed solution being a replacement part, test advisor facility 201 is configured to further query an inventory and production database (e.g., via query component 206) to gather data based on a set of attributes that pertain to the viability of a proposed replacement part solution. For example, in some embodiments, a systems applications and products database and/or a materials flow system database is queried. In one or more embodiments, the systems applications and products database and the materials flow system database are within test advisor facility 201 (e.g., database(s) 214). In some embodiments, the set of attributes includes a part availability, a repair cycle time, a repair action difficulty level, a flag on quality hold/stop ship, a requested scheduled ship date, and/or a planned scheduled ship date, as examples. Other examples are also possible.

As noted above, in one embodiment, graphical user interface component 204 is configured to output the test solution priority list to the user by at least displaying, by system 200 via the graphical user interface, one or more suggested test repair actions in a window that is separate and/or distinct from the heat map. In one or more embodiments, outputting the test priority list via the graphical user interface includes displaying, via the graphical user interface, at least one of the respective confidence scores or respective repair cycle times for the one or more test repair actions. In some embodiments, the respective confidence scores or respective repair cycle times are displayed within the window that is separate and/or distinct from the heat map. In some embodiments, the graphical user interface component 204 is configured to output to the user the test solution priority list, feedback inputs, as well as support information and documents.

In one or more embodiments, test advisor facility 201 is configured to execute one or more multi-criteria decision making algorithms (e.g., via multi-criteria decision making algorithm component 212) to narrow down the one or more suggested test repairs of the test solution priority list based at least in part on a plurality of attributes (e.g., via the querying of the inventory and production database in regards to the set of attributes identified above). For example, in some embodiments, multi-criteria decision making algorithm component 212 is configured to obtain the proposed solution(s) of the priority list that are generated by a rank and retrieve type application programming interface (e.g., rank and retrieve component 208), and then to revise the ranking of the proposed solutions in the priority list in view of the identified constraints. In one or more examples, various suitable multi-criteria decision making algorithms can be utilized to prioritize the proposed solutions based on the importance of the plurality of attributes so that a narrowed down priority list can be outputted via, e.g., the graphical user interface to a user. One example of a suitable type of multi-criteria decision making algorithm can be found in Chanchal Saha et al., "A Decision Support System for Real-Time Order Management in a Heterogeneous Production Environment", Expert Systems with Applications, Oct. 30, 2015, Volume 50. In some embodiments, multi-criteria decision making algorithm component 212 is configured to incorporate manufacturing/inventory constraints (e.g., parts and time availability, requested ship date, and skilled resources attributes), in addition to proposing a revised test solution list that is displayed along with an estimated repair cycle time.

In one or more embodiments, the priority list (e.g., priority list 424 (FIG. 4)) is outputted by test advisor facility 201 without first executing a multi-criteria decision making algorithm. In some embodiments, the multi-criteria decision making algorithm is executed only during the occurrence of a set of constraints, such as when there are limited time and long queues for machine testing. In some embodiments, the set of constraints includes at least one or more of a time limitation, a resource limitation, an inventory limitation, and/or a technical staff availability limitation.

In accordance with one or more aspects of the present invention, test advisor facility 201 includes knowledge transfer component 213, which is configured, in one or more embodiments, to determine whether use of a selected input is to be restricted in the determining and/or the performing of tasks (also referred to as activities) to recover from a failure. In one example, the selected input is user input, in which the user is human. In other examples, the user input may be a robot or other user, and/or the selected input may be other than or in addition to user input. As one example, knowledge transfer component 213 is used to determine whether user knowledge is to be used to perform one or more actions to alter execution of one or more tasks, based on a failure of a system (e.g., an information technology system being manufactured). In one example, the altering execution includes performing at least one action that modifies a task or an aspect related to a task, such as, but not limited to, a sequence in which the tasks are executed or selection of an agent (e.g., system, system component, technician, robot, etc.) to perform a task. As examples, the one or more actions include modifying an activity sequence of the one or more tasks to alter the sequence in which the tasks are executed and/or altering a selection of one or more task performing agents to perform the one or more tasks in which one or more other agents are selected to perform the one or more tasks.

In one embodiment, knowledge transfer component 213 is configured to determine a knowledge transfer score and to determine whether the knowledge transfer score meets at least one predefined criterion. For instance, the knowledge transfer score is compared to at least one knowledge transfer threshold to determine whether an action is to be performed. In one example, there is at least one knowledge transfer threshold for each potential action that a user may perform to alter the execution of the one or more tasks. If the knowledge transfer score has a predetermined relationship (e.g., less than or equal) with a selected knowledge transfer threshold, then the user performs an action(s) associated with that selected knowledge transfer. By using the knowledge transfer score, user involvement is restricted in the decision making as the solution evolves. User input is restricted if, for instance, it is determined that a particular solution was satisfactory in the past. This increases the speed of recovery and improves its processing. However, if a solution did not perform as expected or desired, then user involvement may be used. The knowledge transfer score is, in one or more embodiments, a determining factor on the ability of the computer-based system to autonomously perform one or more actions and/or alter execution of one or more actions without any user (e.g., human) intervention.

Figure 3:
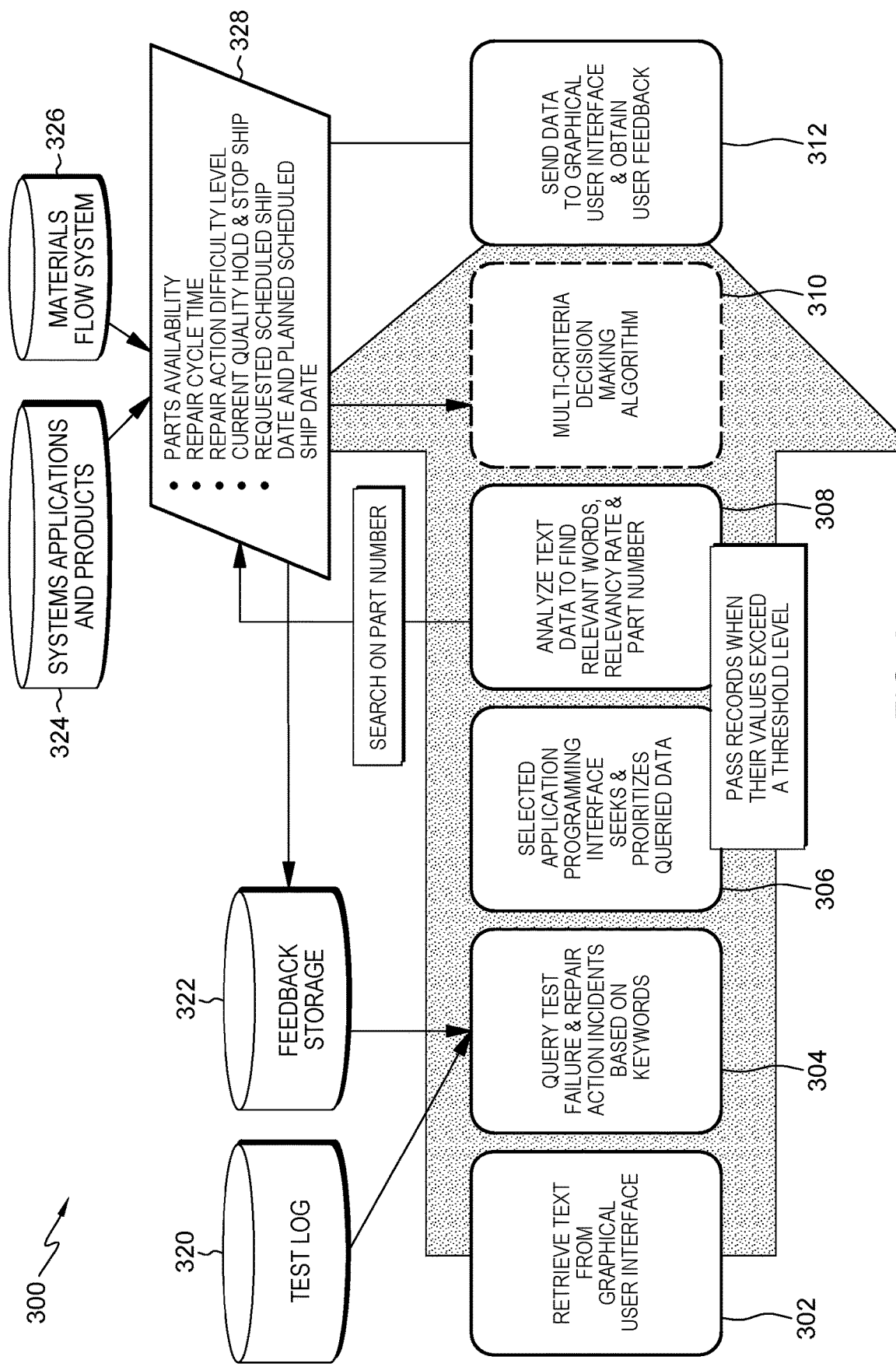
FIG. 3 depicts one embodiment of cognitive test advisor facility processing, in accordance with one or more aspects of the present invention.

FIG. 3 depicts one example of a process flow 300 that can be implemented by system 200 of FIG. 2 in accordance with one or more embodiments. Process flow 300 illustrates a performance of steps in a manner similar to selected functions identified above. As shown in FIG. 3, process flow 300 receives text input from a user at 302. At 304, test failure and repair action incidents are queried based on keywords identified in the user text input (e.g., unstructured data from the input). The querying in this example can include querying a defect database (e.g., test log database 320) and a feedback storage database 322. At 306, selected application programming interfaces, such as a retrieve and rank application programming interface service provided by International Business Machines Corporation (e.g., Watson Discovery service, Watson Natural Language Understanding service) or other service provided by International Business Machines Corporation or other companies is utilized to seek and prioritize the queried data. At STEP 308, the text data from records that have a retrieve and rank index score that is higher than a certain threshold value is analyzed using for instance an application programming interface offered by International Business Machines Corporation or other companies. A list of proposed solutions is identified from the analysis of the text data of the obtained records, in which the list of proposed solutions is identified by finding, for instance, a set of relevant keywords, a relevancy rate, and a part number for each potential solution. The analysis includes searching, for instance, a Systems Applications and Products database 324 and a Materials Flow System database 326 for a set of attributes 328 that are associated with the part number. The set of attributes can include, for instance, a part availability, a repair cycle time, a repair action difficulty level, a current quality hold & stop ship, a requested scheduled ship date & a planned scheduled ship date. At 310, an algorithm (e.g., multi-criteria decision making algorithm) is executed to narrow down the list of proposed solutions based at least in part on the results of the search of the Systems Applications and Products and Material Flow System databases. At 312, the user is provided or sent the resulting priority list that includes the one or more proposed solutions, and the user provides feedback regarding the one or more proposed solutions, such as whether the solution was successful. The feedback is stored in, e.g., feedback storage database 322, which can be subsequently used via machine learning to improve the manner in which subsequent proposed solutions are identified by the system.

Figure 5:
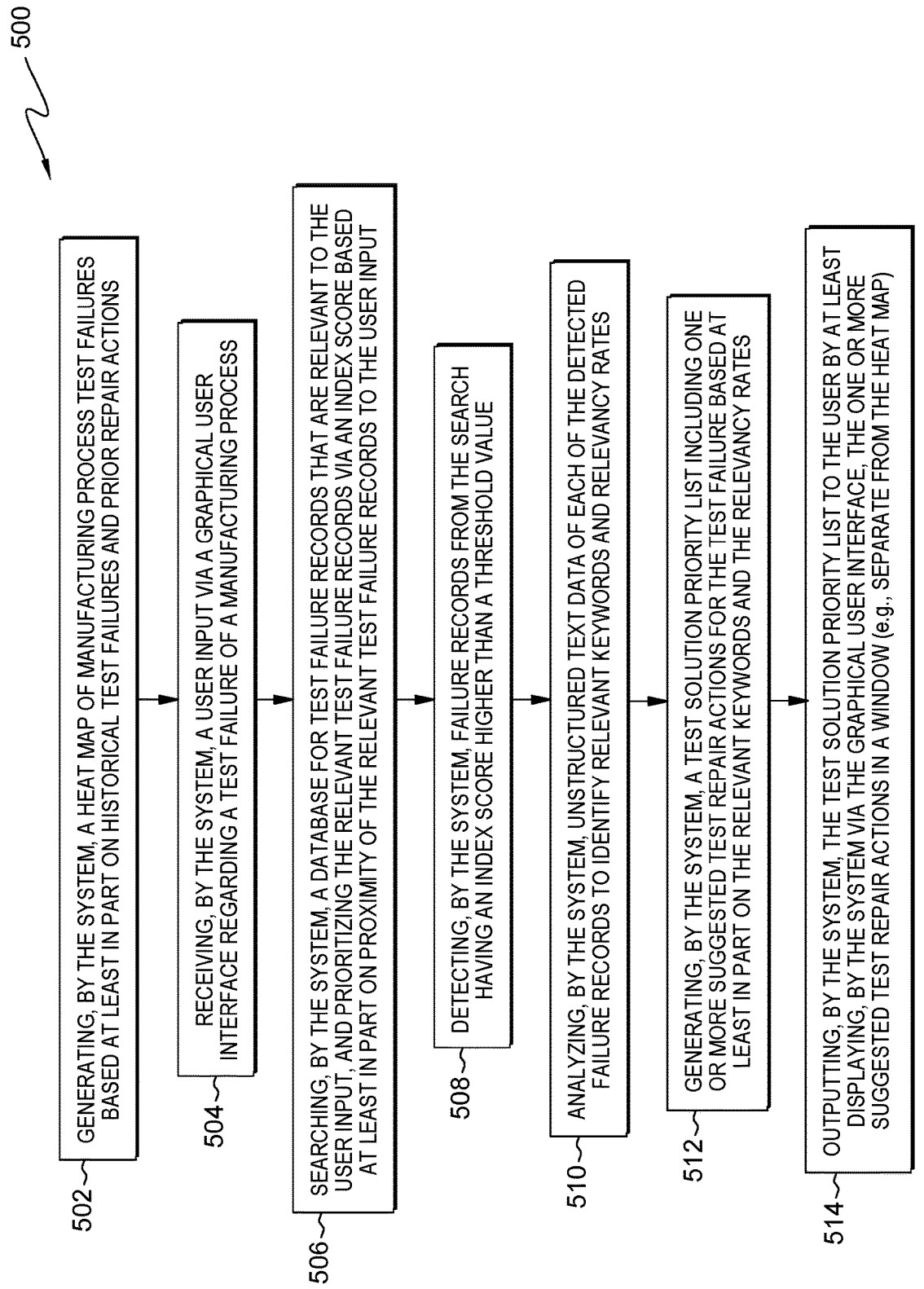
FIG. 5 depicts an operational embodiment of a cognitive test advisor facility, in accordance with one or more aspects of the present invention.

Additional details of the operation of system 200 (FIG. 2) are described below with reference to process flow 500 of FIG. 5. In one example, at 502, a heat map of manufacturing process test failures is generated based at least in part on historical test failures and prior repair actions, in which the heat map is presented to a user via a graphical user interface. At 504, a user input is received via the graphical user interface regarding a test failure of a manufacturing process, in which the user input can include structured and unstructured data. At 506, a database is searched for test failure records that are relevant to the user input. The relevant test failure records are then prioritized via an index score, in which the index score is assigned based at least in part on proximity of the relevant test failure records to the user input. At 508, failure records that have an index score that is higher than a threshold value are detected. At 510, unstructured text data of each of the detected failure records is searched to identify relevant keywords and relevancy rates. At 512, a test solution priority list is generated which includes one or more suggested test repair actions for the test failure based at least in part on the relevant keywords and the relevancy rates. At 514, the test solution priority list is outputted to the user by, for instance, displaying, by the system via a graphical user interface, the one or more suggested test repair actions in a window, such as in a window separate from a heat map. In one or more embodiments, one or more suggested test repair actions are performed, such as, for instance, by the cognitive test advisor system itself (where applicable), or by a technician, and based on the repair action, feedback can be provided to improve subsequent proposed solutions identified by the system, as described herein.

In some embodiments, structured and unstructured test result data and problem records can be used to establish relationships between test steps and root causes, in which the test steps indicate steps that are likely to fail given the presence of a root cause. In some embodiments, the processes identified above (e.g., process flow 300 of FIG. 3 and methodology 500 of FIG. 5) can be used to identify symptoms of a test failure rather than a root cause. For example, in some embodiments, a root cause can be a subsystem component failure whereas a symptom can be a subsystem failure. In some embodiments, by avoiding tests which are related to a subsystem failure, more tests are screened out in comparison tests of a subsystem component failure. Accordingly, depending on the given test scenario, in some embodiments, the system is configured to identify a root cause, a system failure screening, or both.

As noted, in one or more embodiments, the cognitive test advisor facility disclosed herein is configured to generate test plans, and/or suggested test repair actions, based on test value root causes and/or symptoms. In one or more embodiments, the facility analyzes structured and unstructured data using machine learning processes to determine one or more best possible test repair action recommendations, based on the user input. Further, in one or more embodiments, solutions to several challenges when querying unstructured data for failure analysis and prioritizing recommendations for repair actions are provided. For example, in one embodiment, in querying the unstructured data from databases based on a user input, the user input is expanded for non-exact-match words, spelling errors, non-technical word data (e.g., non-English data), part history, etc. In accordance with one or more embodiments, smart queries of manufacturing test data based on user inputs are created, via data analytics, proposing recommendations for repair actions that are meaningful and different from one another, and finding content for the tag clouds using multiple word and/or data dictionaries incorporated as part of, or available to, the test advisor facility.

Figure 6:
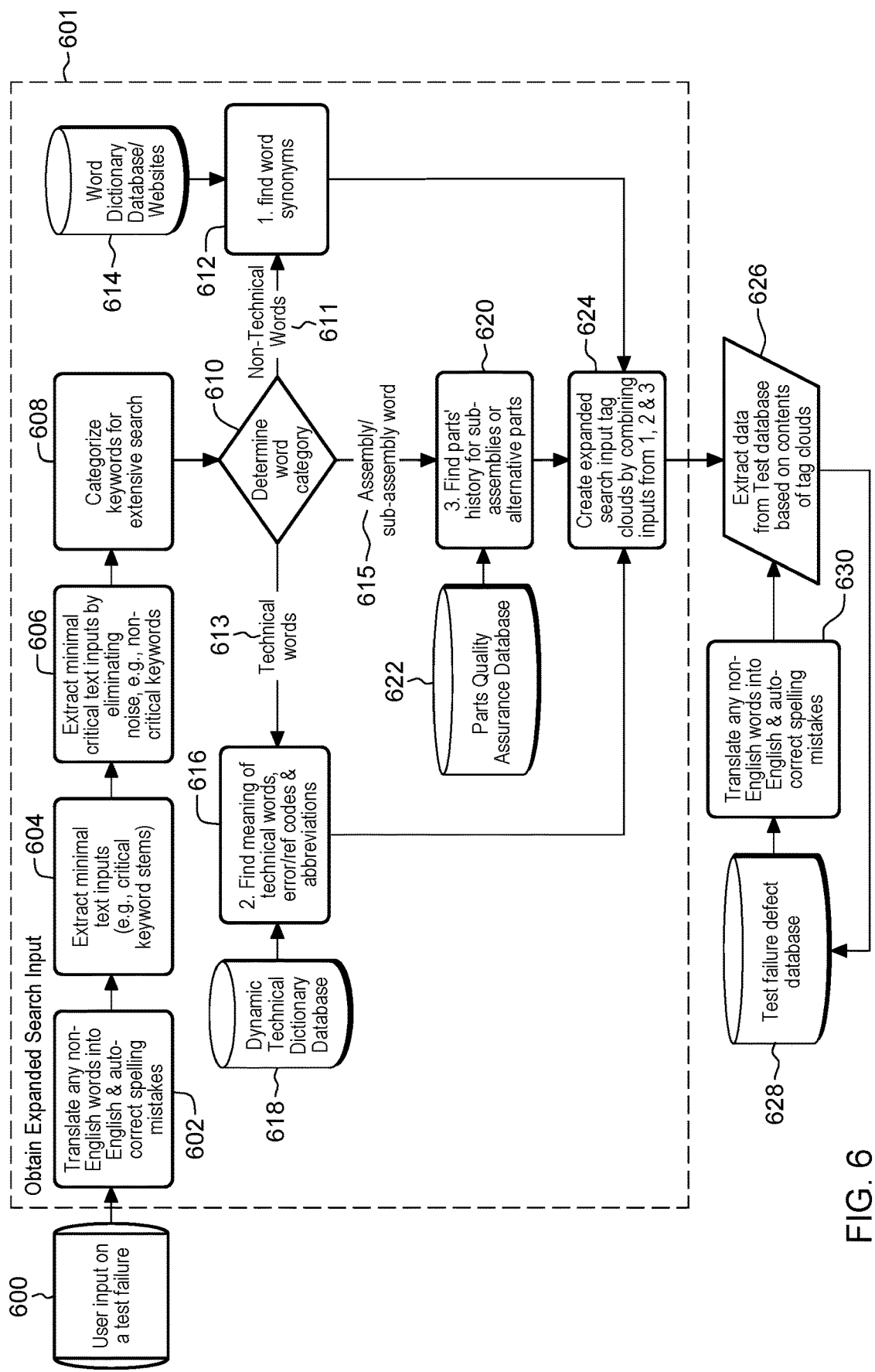
FIG. 6 depicts one embodiment of generating an expanded search input, and expanded searching, by cognitive test advisor facility processing, in accordance with one or more aspects of the present invention.

By way of example, FIG. 6 depicts one embodiment of test advisor facility processing that expands the search horizon for querying manufacturing test data based on a user input. As illustrated, in one example, one or more user inputs on a test failure are received 600 by the facility, which processes the user input data to obtain an expanded search input 601. The obtaining of the expanded search input can include, for instance, facility program code translating any non-English words into English and auto-correcting any spelling mistakes 602. (Note that processing of the user input using English language is provided herein by way of example only. The facility can be configured to process user input in any desired language.) Facility program code extracts the minimal text input by, for instance, obtaining critical keyword stems in the user input 604. Program code further extracts the minimal text input by eliminating noise; that is, eliminating any non-critical keywords 606. For instance, any words that will not add value to the search can be eliminated. The facility then categorizes the keywords for extensive searching 608. In one embodiment, the categorizing includes categorizing the words into, for instance, non-technical words, technical words, and assembly/sub-assembly words, such as part identifiers. In one or more embodiments, the facility determines for a particular keyword the applicable word category 610. Based on the word being a non-technical word, such as an English word, program code identifies any synonyms 612, such as available to the facility from electronic dictionaries, databases, and/or websites 614. Based on the word being a technical word 613, then program code identifies one or more alternate meanings of the technical word 616 using, for instance, a dynamic technical dictionary data structure/database 618, such as described herein.

FIG. 7 depicts one embodiment of a dynamic technical dictionary data structure 700. As an example, dynamic technical dictionary structure 700 includes a technical words column 702, an alternative words column 704, and a relationship strength column 706 for each pairing. In the depicted example, the technical word "node" has multiple synonyms, such as complex, frame, drawers, book, and a relationship strength score is depicted for each pairing, to identify, for instance, which alternative is most closely related to the keyword at issue. In one embodiment, the relationship strength is determined by a combination strength score and a reinforcement learning score. By way of example, the combination strength score can be a score determined using an available natural language processing keyword search matching algorithm. The reinforcement learning score can be determined using a hierarchical reinforcement learning algorithm, such as described herein.

Continuing with FIG. 6, from inquiry 610, the program code can determine that the word is in the assembly/sub-assembly word category 615; that is, is a part identifier, as an example. In such a case, part history information (such as alternative part information) can be determined for the sub-assembly 620 with reference to one or more parts quality assurance databases 622. The facility can create expanded search input tag clouds by combining the expanded words obtained from finding word synonyms, finding meaning of technical words, and finding parts history 624. The expanded search input tag clouds are then used to extract data 626 from one or more test failure defect logs or databases 628. In one or more embodiments, any non-English words retrieved from the database(s) are translated by the facility into English, and any spelling mistakes autocorrected 630 before, for instance, undergoing prioritization and evaluation for relevancy, as described herein.

By way of further explanation, FIG. 8 depicts an example of the computer-implemented process of FIG. 6. In the embodiment of FIG. 8, a user input of "Eror Error Code in modul XYZ re-code failure" 800 is received. As illustrated, processing initially translates any non-English words into English, and autocorrects any spelling errors. By way of example, auto-correct program code and translator program code for pattern recognition processing can be incorporated as part of, or accessed by, the test advisor facility to accomplish these processes. The illustrated result is a conversion of the user input to "Error Error Code in module XYZ re-code failure" 802. As noted, in one or more embodiments, the test advisor facility includes program code for categorizing keywords for extensive searching. In one or more embodiments, the categories can include technical words, non-technical words (e.g., English words), as well assembly/sub-assembly words or part words. This categorizing is to facilitate finding the minimum critical input data from which to expand the query data. As noted with respect to FIG. 6, the non-technical words, technical words and part words are separately processed in one embodiment. For instance, in the example of FIG. 8, the technical words "Error Code", "re-code", and "module" are extracted, and program code locates synonyms or alternatives for each. In one or more embodiments, the meaning of each technical word is determined and expanded using a dynamical technical dictionary data structure with relationship strength scores, such as described herein. FIG. 8 depicts sample tag cloud outputs 804 based on the expanded technical words. Similarly, facility program code extracts the English words "error" and "failure" and determines synonyms or alternatives from, for instance, one or more available electronic dictionaries, word databases, websites, etc. As illustrated, each English error word is extracted from the user input, and the related synonyms or alternatives are output or provided as a respective expanded tag cloud (i.e., expanded search input tag cloud). Similarly, facility program code expands the assembly/sub-assembly or part-related words "XYZ" to include "XYZa, XYZb". Program code determines the expanded terms by determining the parts history for a particular sub-assembly, or by determining alternative parts information, based on one or more parts history databases. In this manner, the additional content in the tag clouds 804 is obtained for use as an expanded search input to extract data from one or more databases using the additional contents of the tag clouds, as described above in connection with FIG. 6.

In one or more aspects, the computer-implemented dynamic technical dictionary structure, or a separate computer-implemented, dynamic technical dictionary data structure, can also be used to derive recommendations for addressing a test failure that are unique, meaningful and potentially different from one another. In particular, in one or more embodiments, the dynamic technical dictionary structure is provided with error codes for the particular manufacturing process tests at issue. Depending on the product family, there may be tens of thousands of error codes for inclusion in the dynamic technical dictionary data structure. Additionally, the dynamic technical dictionary structure is provided with associated reference codes, such as reference code patterns captured in test error messages. In one or more embodiments, the reference codes are each tied or associated with one or more suggested repair actions in a data repository. Further, as noted herein, a relationship strength score indicative of the relationship strength between a particular error code and reference code is provided. These relationships lead to the ability to generate multiple distinct recommendations that are unique. Using this dynamic technical dictionary data structure, the relationship strengths between an error code and a reference code can determine which possible repair action recommendations are to be provided back to the user by the test advisor facility. Note in this regard that a single error code can refer to multiple reference codes, and a single reference code can refer to multiple possible repair actions. Further, note that multiple error codes can refer to the same reference code, depending on the implementation and the repair action required.

Figure 9A:
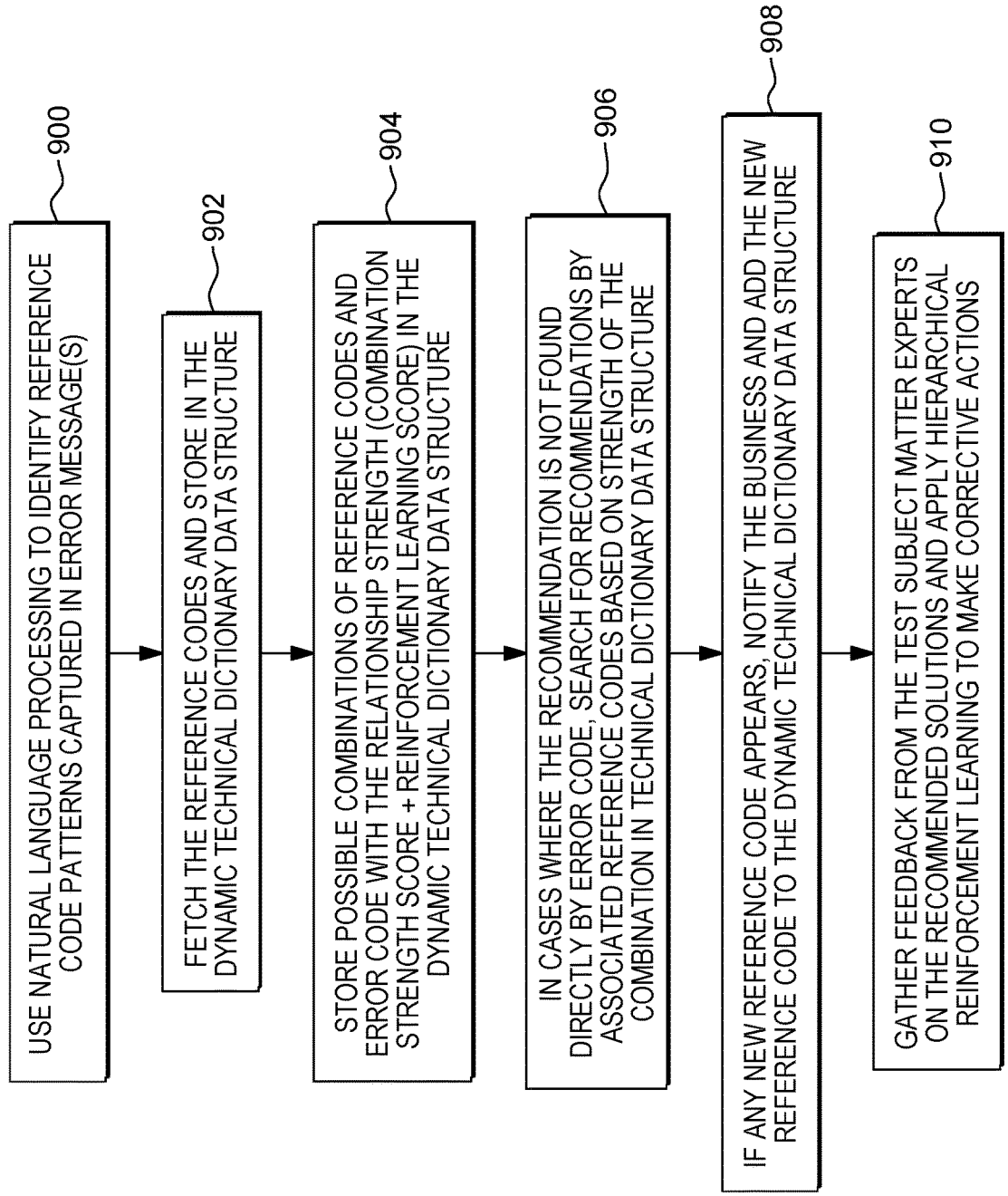
FIG. 9A depicts one embodiment of cognitive test advisor facility processing that updates a dynamic technical dictionary data structure with corrective actions using hierarchical reinforcement learning, in accordance with one or more aspects of the present invention.

FIG. 9A depicts one embodiment of a facility process to establish and use a dynamic technical dictionary or data structure as described herein. As illustrated, in one or more embodiments, the cognitive test advisor facility utilizes natural language processing to identify reference code patterns captured in a plurality of error messages, with error codes 900. For instance, a database of test failures can be accessed, with the error codes associated with each error message being extracted, and natural language processing of the test failure error messages being used to identify a reference code pattern for one or more messages. The error codes are saved to the dynamic technical dictionary structure, along with the associated reference codes found in the error messages for each error code 902. The possible combinations of reference codes and error codes are stored along with an associated relationship strength score (e.g., determined as described herein) within the dynamic technical dictionary structure 904. As noted, the relationship strength score can be determined as a combination strength score and a reinforcement learning score, as the terms are defined herein. In cases where a recommendation is not found in a recommendations data structure directly by an error code, then recommendations can be identified through associated reference codes based on the relationship strength(s) of the combinations 906. Additionally, if any new reference code appears, the manufacturing business can be notified and the new reference code can be added to the dynamic technical dictionary data structure 908. In one or more implementations, feedback can be gathered from one or more subject matter experts on the results of recommended solutions, and the hierarchical reinforcement learning algorithm can be applied to take any corrective actions 910, as described herein.

FIG. 9B depicts one embodiment of the above-noted facility processing. In a first step, one or more databases of error codes and error code messages are accessed 920 to obtain a listing of error codes 922 for adding to the dynamic technical dictionary data structure. Additionally, in one or more embodiments, the cognitive test advisor facility uses natural language processing of the error messages to identify one or more reference codes for each error code. In addition, the facility determines for each pairing a relationship strength score, such as a combination strength score and a reinforcement learning score, as explained herein. The resultant dynamic technical dictionary data structure 924 is then used in determining or identifying meaningful and unique recommendations, which can include one or more potential repair actions, along with a historical success rate for each recommended repair action and present the information in a solution priority list 926. For instance, in one or more embodiments, the reference code from the dynamic technical dictionary data structure can be used to reference a repair action data structure from which the facility can generate the solution priority list. In one or more embodiments, one or more subject matter experts or domain experts in a particular manufacturing and/or testing area provide feedback on whether one or more repair action recommendations were successful or unsuccessful, which is then used by the facility in the reinforcement learning process to adjust relationship strength scores in the dynamic technical dictionary data structure, as described herein.

FIGS. 10A-10F depict further details of one embodiment for providing reinforcement learning incorporating subject matter expert feedback on recommended repair actions.

Figure 10A:
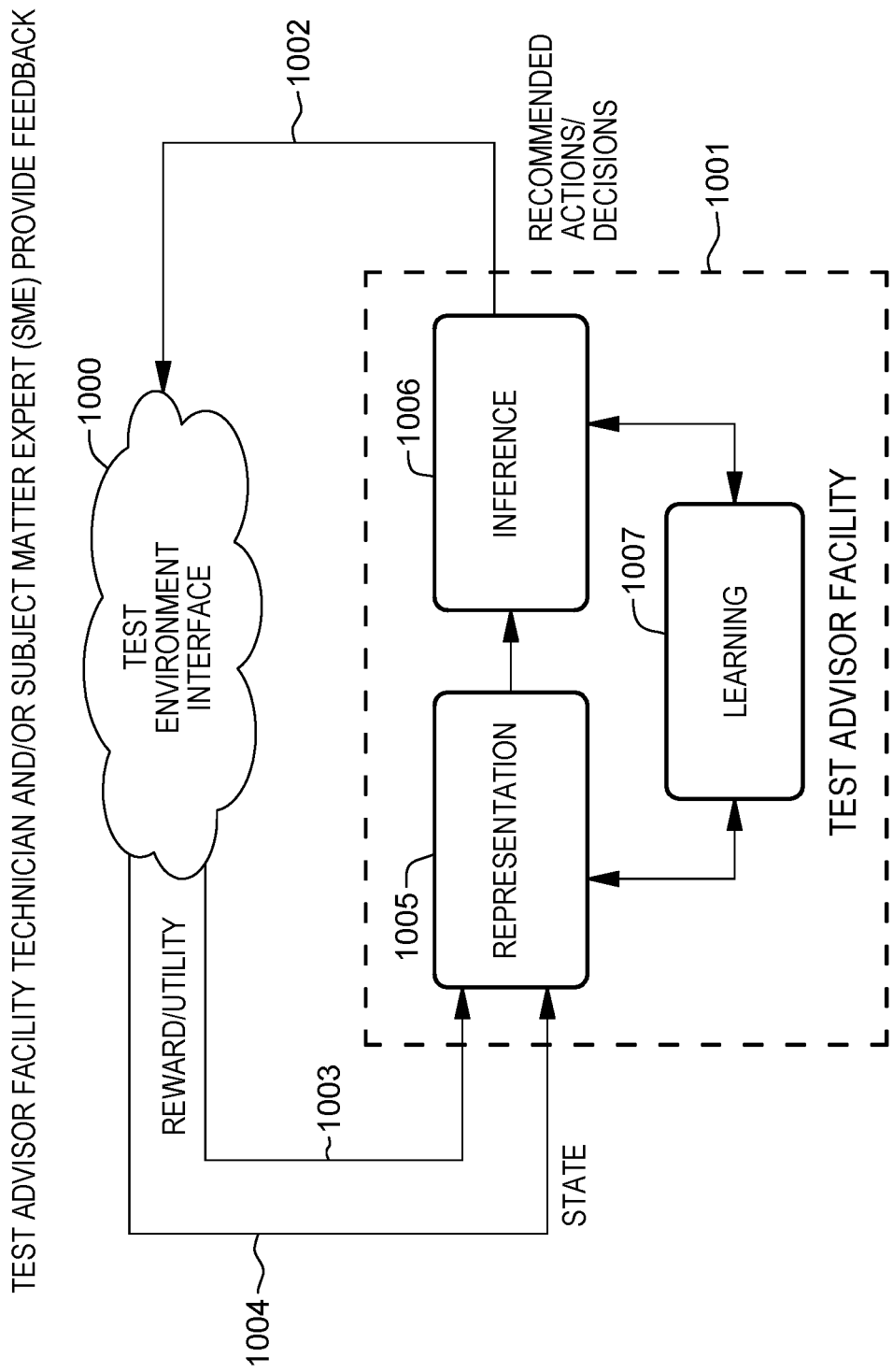
FIG. 10A depicts a high-level embodiment of cognitive test advisor facility processing, in accordance with one or more aspects of the present invention.

As illustrated in FIG. 10A, in one or more implementations, test advisor facility program code 1001 uses one or more dynamic technical dictionary data structures in providing repair recommendations as actions/decisions 1002. An action/decision is a particular repair action recommendation of (e.g., all) possible repair action recommendations. The actions/decisions 1002 are provided to the test environment 1000 which, in one or more embodiments, includes a test platform/subject matter expert/feedback interface. Test environment 1000 provides rules and/or decisions on whether to reward and/or penalize a particular recommended action. In one embodiment, a reward/utility 1003 is an indication of feedback from the test environment by which success or failure of the test advisor facility's recommendation is measured. A state 1004 indicates the situation where the test advisor facility finds itself, and policy is an action that the test advisor facility takes to change state. As described herein, in one or more implementations, test advisor facility program code 1001 incorporates cognitive machine learning to evaluate the representation 1005 of the manufacturing test process, determine one or more inferences 1006 therefrom, and to make adjustments 1007 to assess, resolve, and improve recommended repair actions based on the feedback provided. In one or more implementations, the test advisor facility can be configured with, or utilize, machine learning to make adjustments to the recommendations derived from the dynamic technical dictionary data structure using reinforcement learning. Providing a feedback loop update mechanism using reinforcement learning such as described herein assists in quantifying the strength, by penalizing or rewarding a particular user's feedback (e.g., through recognizing a user's position or expertise), ensures a robust/meaningful feedback learning capability, and where desired, provides an emphasis on recent inputs, to influence a particular action/recommendation. For instance, the system can penalize down votes provided by the subject matter expert via the graphical user interface and reward up votes for a particular recommendation.

In one or more embodiments, reinforcement learning can use a reinforcement learning score, or hierarchical reinforcement learning score, $Z_i$ determined as:

$$Z_i = \sum_{t=1}^{\infty} \sum_{i=1,k=1}^{I,K} \gamma^t ((r_i(x(t), a(t)) \times w_{ik}))$$

where:
$Z_i$=hierarchical reinforcement learning score for $i^{th}$ action (i=1 . . . I);
$\gamma$=discount factor to accommodate future reward (0<$\gamma$≤1);
$r_i$=rewards/penalty for $i^{th}$ action;
$w_{ik}$=weight for $i^{th}$ recommendation for $k^{th}$ person (k=1 . . . K);
x=state;
a=action/decision; and
t=time.

For example, for a test failure, the test advisor facility might provide a repair recommendation (i) as "retry XX00YYY DIMM CD/MM 32 GB MEM". The user's (k) feedback ($r_i$) for that repair recommendation at various times can be expressed as:
$\gamma$=discount factor to accommodate future reward (0<$\gamma$≤1);
$r_i$=rewards/penalty for $i^{th}$ action −1≤$r_i$≤1;
$w_{ik}$=weight for $i^{th}$ recommendation for $k^{th}$ person (k=1 . . . K).

Figure 10B:
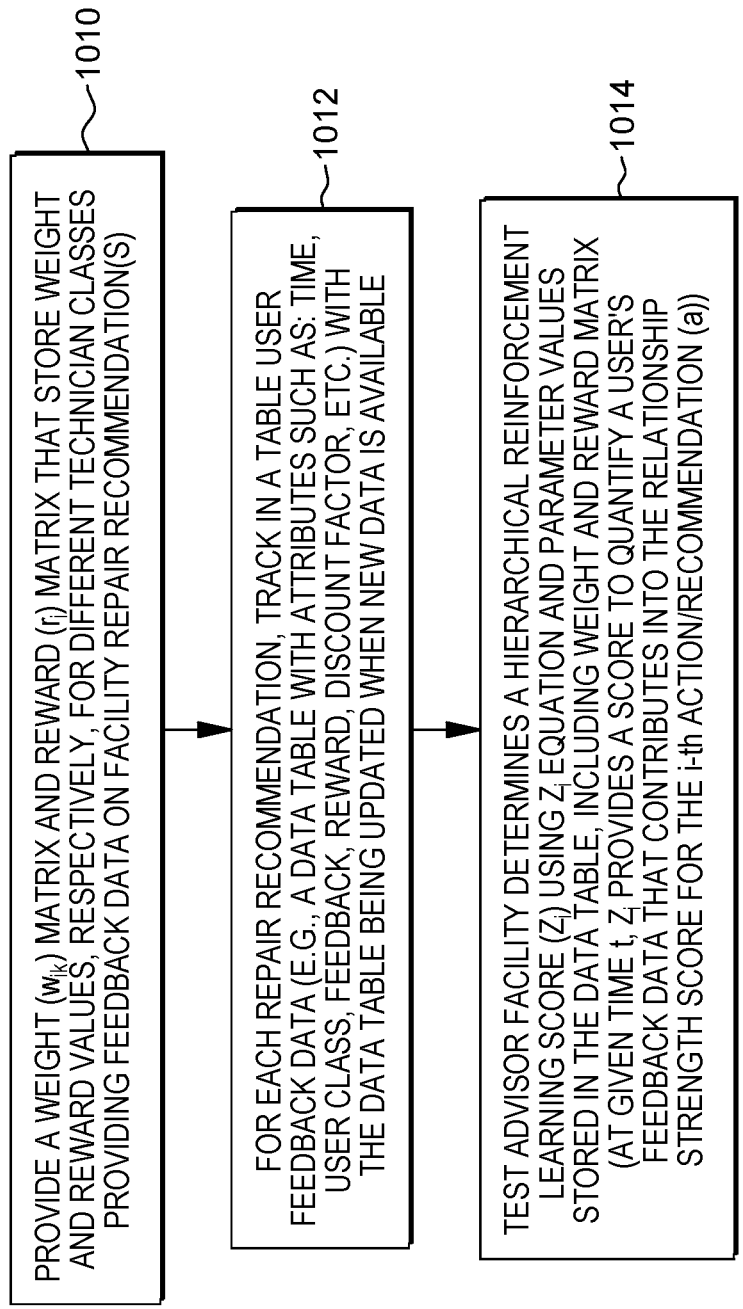
FIG. 10B depicts one embodiment of cognitive test advisor facility processing with hierarchical reinforcement learning, in accordance with one or more aspects of the present invention.

FIG. 10B depicts one embodiment of determining a hierarchical reinforcement learning score ($Z_i$), where a higher level of score $Z_i$ means a higher association of a repair action recommendation to a corrective action. A weight ($w_{ik}$) matrix and a reward ($r_i$) matrix are provided to store weight and reward values, respectively, for different technician classes providing feedback on repair recommendations 1010. By way of example, FIG. 10C depicts one example of feedback results obtained from different users (k); FIG. 10D depicts an example weight matrix; and FIG. 10E illustrates an example reward/penalty ($r_i$) matrix obtained from the feedback provided. As depicted in the weight matrix of FIG. 10D, feedback data from different subject matter expert positions (e.g., test lead, test engineer, test tech) can be weighted differently, and the reward/penalty matrix of FIG. 10E can be used to quantify the particular feedback provided by the subject matter expert.

As illustrated in FIG. 10B, for each repair recommendation, the test advisor facility program code can track in a table the user feedback (e.g., a data table with attributes such as: time, user class, feedback, reward, discount factor, etc.), with the data table being updated when new data is available 1012. An example data table is depicted in FIG. 10F, where feedback on a repair action recommendation is provided at different times by different users, with an associated reward/penalty ($r_i$) and weight ($w_{ik}$). Returning to FIG. 10B, the test advisor facility program code determines a hierarchical reinforcement learning score ($Z_i$) 1014 using, for instance, the above-noted equation and parameter values stored in the data table, including, in one or more embodiments, weight and reward matrix values. For instance, at a given time (t), $Z_i$ provides a score to quantify a user's feedback that contributes into the relationship strength score for the $i^{th}$ action/recommendation (a), as discussed herein.

In accordance with one or more aspects of the present invention, a test advisor facility (e.g., test advisor facility 201; also referred to as a testing system) is configured (e.g., programmed), in one or more embodiments, to determine for a derived recommendation for a system failure, one or more activities or tasks to be performed to execute the recommendation. Further, for each activity, a task performing agent is selected. Moreover, in accordance with one or more aspects of the present invention, the test advisor facility is configured to restrict a selected input (e.g., user knowledge transfer) in select decision making as a failure recovery solution evolves in its definition. One or more of these aspects are described further with respect to FIG. 11.

Figure 11:
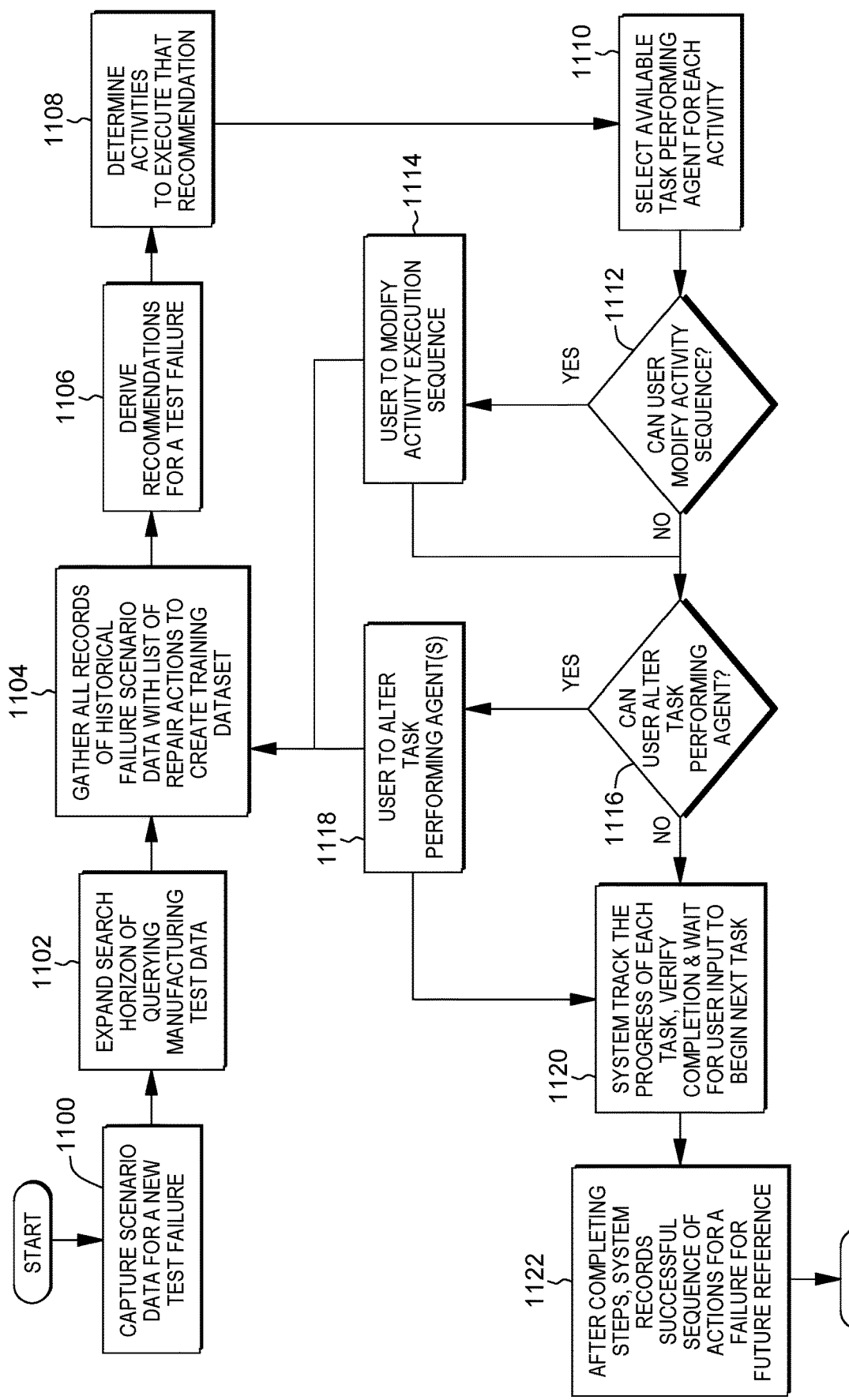
FIG. 11 depicts another embodiment of cognitive test advisor facility processing which includes processing to restrict use of a selected input in the test advisor facility processing, in accordance with one or more aspects of the present invention.

Referring to FIG. 11, in one embodiment, scenario data is captured for a new test failure determined, e.g., by the test advisor facility, 1100, and a search horizon for querying manufacturing test data is expanded, STEP 1102, as described herein in one or more embodiments. Additionally, in one embodiment, records of historical failure scenario data are gathered with a list of repair actions to create a training dataset 1104, as described herein in one or more embodiments.

Based on the collected data, one or more recommendations for a test failure are derived 1106, and one or more activities are determined that are to be used to execute the one or more recommendations 1108, as described herein in one or more embodiments.

As one example, word2vec and K-means clustering are used to derive recommendations and determine activities (tasks) to execute for the recommendations. For instance, unstructured text (e.g., replace I/O card; emergency power off cycle machine; restart; swap input/output card; reboot the machine; insert new I/O card; restart the operation; run the operation again; power cycle the machine; etc.) is input to a classification technique, such as word2vec and/or K-means clustering, which outputs classifications, including classes (e.g., recommendations) and suggested tasks for those recommendations. Example classifications for the example input provided above include:

Class—Restart machine, with suggested tasks including: emergency power off cycle machine, restart, reboot the machine, and power cycle the machine Class—Input/output (I/O) card swap, with suggested tasks including:
replace I/O card, swap I/O card, and insert new I/O card Class—retry operation (op), with suggested tasks including:
restart the operation, and run the operation again In another example, machine learning is used to derive recommendations and determine activities (tasks) to execute for the recommendations. For instance, a selected supervised machine learning algorithm of a number of supervised machine learning algorithms receives an input, such as failure scenario data, and provides an output, such as one or more recommended solutions. For instance, an input of failure scenario data (e.g., driver=Driver1; operation OpX; machine type=Type1; hardware under test=power system; system error code=ErrorCode; time insight index (1 to 10): 2; number of tested machine: 10; etc.) is provided to a selected supervised machine learning algorithm and an output of solution classes (e.g., class—restart machine—81%; class—I/O Card swap—10%; class—retry op—9%; etc.) is provided. The machine learning algorithm also provides, in one embodiment, suggested tasks for each recommendation, examples of which include: for restart machine—emergency power off cycle machine, restart, reboot the machine, and power cycle the machine; for I/O card swap—replace I/O card, swap I/O card, and insert new I/O card; and for retry operation (op)—restart the operation, and run the operation again.

Although examples of recommended solutions and tasks to perform those solutions are provided herein, these are only examples. Additional, fewer and/or other recommendations and/or additional, fewer and/or suggested tasks for the recommendations noted herein and/or other recommendations may be provided. The recommendations and tasks provided herein are not meant to be limiting in any way.

Continuing with FIG. 11, based on the determined activities or tasks, one or more available task performing agents are selected for each activity 1110. For instance, if a part is to be replaced, an indication of an agent (e.g., a robot, system, system component, tool, technician, etc.) to replace the part is selected. This selection is determined based on the task to be performed and available agents capable of performing such a task. In one example, an indication of tasks and available agents are provided in a data structure, such as a database or table. For instance, for each activity or task of at least selected tasks previously performed, a record is maintained of what agent carried out the task. This information is then queried (e.g., automatically by the test advisor facility) and is to be used to select the agents to perform the tasks for the recommended solutions. Further, in one embodiment, if there are multiple agents that can perform a task, they may be prioritized, or a weight may be provided based on desirability. For instance, a robot may be weighted higher than a technician in replacing a part. Other examples are also possible.

Further, in accordance with an aspect of the present invention, a determination is made as to whether selected input (e.g., user knowledge transfer) in select decision making as a failure recovery solution evolves in its definition is to be restricted. For instance, one or more decisions are made as to whether a user (e.g., a human, a robot, etc.) is to perform one or more actions to alter execution of one or more tasks. As used herein, alter execution includes, for instance, altering an execution sequence of one or more tasks and/or altering selection of a task performing agent. However, these are just examples. Altering execution may include other actions in one or more embodiments.

In one example, a determination is made as to whether a user is to modify an activity sequence of the tasks to be performed 1112. As an example, this is determined based on a knowledge transfer score. In one particular example, the knowledge transfer score is determined by comparing the delta between the normalized detractor parameters (e.g., quality commodity index (first pass yield (FPY)), field incident index (field replaceable unit (FRU) log), engineering system test index, etc.) and an F1 score for a repair log repository (e.g., a fabrication test log, a make-to-order test log, etc.). One equation to be used to determine a knowledge transfer score, T, is as follows:

$$\text{Knowledge Transfer Score, } T = F1 - \frac{\sum_{i=1}^{I} K_i \times w_i \times D_i}{I}$$

$$\text{Measure of accuracy score, } F1 = 2 \times \frac{1}{\frac{1}{P} + \frac{1}{R}} \times 100$$

$$\text{Precision, } P = \frac{\text{True positives}}{\text{True positives} + \text{False positives}}$$

Precision: It is a number of correct positive results divided by the number of positive results predicted by the classifier $$\text{Recall, } R = \frac{\text{True positives}}{\text{True positives} + \text{False negatives}}$$

Recall: It is the number of correct positive results divided by the number of all relevant samples (all samples that should have been identified as positive)

$K_i$: determines whether a parameter is relevant $D_i$: Normalized detractor parameters score (0 to 100) [Quality indexes, such as mean time to failure, FRUs (field replacement units) mean time between failures, etc.]

I: Total number of parameters $X_j$: Knowledge transfer threshold values, where j=performing agent or list of sequence $w_i$: Importance of a detractor parameter [i=1 . . . I]

Figure 12B:
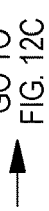

Examples of using K(i), D(i), w(i) values are depicted in FIGS. 12A-12C. In the figures, TA BOT is, for instance, a test advisor facility (e.g., test advisor facility 201); MTTF is mean time to failure; and RPA is robotic process automation. In one example, the values of K(i) and w(i) are determined by one or more subject matter experts and may be reviewed from time to time by the subject matter experts or others, including automatically, in one embodiment, by a test advisor facility (e.g., test advisor facility 201). For instance, K(i) is a binary (e.g., 0 or 1) indication of whether a particular activity (e.g., activities 1-8 of FIG. 12A) is relevant, where a 0 indicates irrelevant and a 1 indicates relevant for the particular failure; and w(i) provides a weight (e.g., between 0 and 1) for a particular activity (see, e.g., FIGS. 12B-12C). The value of D(i) is based on various quality parameters, such as, but not limited to, a quality commodity index, a field incident index, an engineering test index, etc. These values are available, in one example, in one or more quality related databases. The normalized value of each of the quality parameters (also referred to as detractors) is D(i).

In one example, the F1 score is a harmonic mean between precision and recall. The range of F1 Score is e.g., [0, 100], and it illustrates how precise the classifier is (how many instances it classifies correctly), as well as how robust it is (it does not miss a significant number of instances). To determine F1, in one example, a search of the historical failures is performed, where the solution steps match the current suggestion by the system. A subset of those historical failures is taken, where they match the failure scenario by at least M, described below, and that subset is called S.

M is used to determine if a failure scenario is new, where new means that this failure scenario is very different than any other seen historically.

Threshold=M; a sample M=0.75=75%

Given the list of all historical failures with n input scenario parameters paired with the list of actions taken to resolve, if at least M of the n input parameters match the failure in question, there is a match and the failure is not new. If it is new, the record is automatically injected (e.g., by test advisor facility 201) into the training data set.

An example calculation of F1 is shown below:

All historical Data (Training)

| Attributes | A | B | C | D | Model Guess | Correct Solution |
|---|---|---|---|---|---|---|
| 1 | e | f | g | h | x | y |
| 2 | h | h | g | g | z | y |
| 3 | e | f | f | h | y | y |
| 4 | f | f | g | h | x | x |
| 5 | h | f | g | 3 | y | x |
| 6 | e | f | g | g | x | x |

Failure Scenario in Question

| Attributes | A | B | C | D | Model Guess |
|---|---|---|---|---|---|
| 1 | e | f | g | h | x |

Matching rows from history for at least M=0.75 attributes and matching model guess: 1, 4, 6

Precision(x) is the fraction of events where correctly declare x out of all declarations of x Recall(x)=is the fraction of events where correctly declare x out of all cases of x Precision(x)=2/3

Recall(x)=2/3

F1=2*((P*R)/(P+R))×100

F1=2*((4/9)/(4/3))×100

F1=2/3×100

T=66.67−42.59=24.08

As one example, if $T>X_j$, then no user input is allowed; and if $T<=X_j$, then user input is suggested. The value of a threshold, $X_j$, is based, for instance, on the action to be performed (e.g., type of performing agent or sequence list). As a particular example, $X_j$ is set equal to a selected value, such as 80.00. Other threshold values are also possible.

Returning to 1112, if user input is suggested, then a user is to provide suggested modifications for the activity execution sequence 1114, and processing continues at 1104. Further, in one example, a determination is made as to whether a user is to alter selection of a task performing agent for a particular activity 1116. Again, if user input is suggested, then the user can suggest a change to the selection of task performing agent 1118, and processing continues at 1104. Returning to inquiries 1112, 1116, if it is determined that the user input is not to be accepted (i.e., it is restricted), then an indication is provided that the user input is not to be accepted. In one example, this indication is a refraining by the test advisor facility from performing the one or more actions that would have been suggested by the user if its input was accepted (e.g., modification of task execution sequence, modification of selection of task performing agent). In one or more other examples, the indication may be a log of the restricted input; many examples are possible.

Additionally, if no user input is to be used or if one or more actions are performed based on accepted user input, processing continues with tracking, by the test advisor facility, the progress of each task, verifying completion and waiting for user input, if any, to begin the next task 1120. Based on completing the process, the system records a successful sequence of actions for a failure for future reference, assuming the sequence is considered successful 1122.

As described herein, in one or more aspects, a test advisor facility is provided that leverages restriction of a selected input (e.g., user input) related to execution of tasks to fulfill a recommendation to correct for a failure of a system. In one embodiment, a testing system (e.g., test advisor facility 201) obtains (e.g., determines, is provided, retrieves, generates) an indication of one or more tasks to be performed, based on a failure of a system (e.g., an information technology system being manufactured). The testing system automatically determines whether a user is to perform one or more actions to alter execution of the one or more tasks. The automatically determining is based on an indication of whether a knowledge transfer score of the user meets at least one predefined criterion (e.g., does the knowledge transfer score have a selected relationship (e.g., less than or equal) with respect to at least one selected knowledge threshold—in one example, there is one threshold per potential action to be suggested by the user). Based on the knowledge transfer score meeting the at least one predefined criterion, the one or more actions are performed. As examples, the one or more actions include modifying an activity sequence of the one or more tasks and/or altering a selection of a task performing agent to perform at least one task of the one or more tasks.

However, in one embodiment, based on the knowledge transfer score failing to meet the at least one predefined criterion, an indication is provided, by, e.g., the testing system, that the one or more actions are not to be performed. For instance, the indication includes refraining from performing the one or more actions.

In one example, when it is determined that the user is to perform an action, a graphical user interface, of or coupled to the test advisor facility, allows users to interact with the test advisor facility for decision improvements and to give a check list of actions to fix any test failures. The user can, e.g., edit the order and/or the performing agent of each step of a prescribed list of actions. The user can mark a prescribed list of actions as successful or not. When marked as unsuccessful, this record is updated and added to the training data set for improvement. Within the check list of actions, anything that is found to be solved autonomously by the system, is executed by that system.

In one or more aspects, based on occurrence of a test failure (or failure at another time), the test advisor facility automatically detects the reason of failure and proposes one or more recommendations, e.g., without any user inputs (e.g., absent human inputs). The test advisor facility also proposes, in one example, a list of actions and their respective task performing agent to correct the failure. Prior to executing those tasks, in accordance with one or more aspects, the test advisor facility calculates a knowledge transfer score and compares it to a threshold value. If the knowledge transfer score is, e.g., lower than or equal to the threshold value, then the test advisor facility allows the user to modify/change an activity sequencing and/or task performing agent. By the knowledge transfer process, the test advisor facility learns from the user experience/activity and thereby, improves the knowledge transfer score with the passing of time. Eventually, this process enables the test advisor facility to automatically make decisions upon test failure and execute test repair actions without user intervention. One or more aspects facilitate machine learning from user activities and becoming autonomous over time. In one aspect, the test advisor facility is able to confirm that an action completed successfully through the use of one or more verification tools, such as a floor control system, and/or other systems.

As described herein, cognitive technology and/or machine learning are used in one or more aspects of the present invention. Machine learning is used, for instance, to collect data regarding a failure, solutions, etc. and to evaluate the data to continue learning. Machine learning algorithms generate and train algorithms to create a model utilized to train and/or evaluate recovery solutions. For instance, in an initialization stage, program code (e.g., hardware and/or software) trains these algorithms, based on, for instance, patterns and/or other data.

Figure 13:
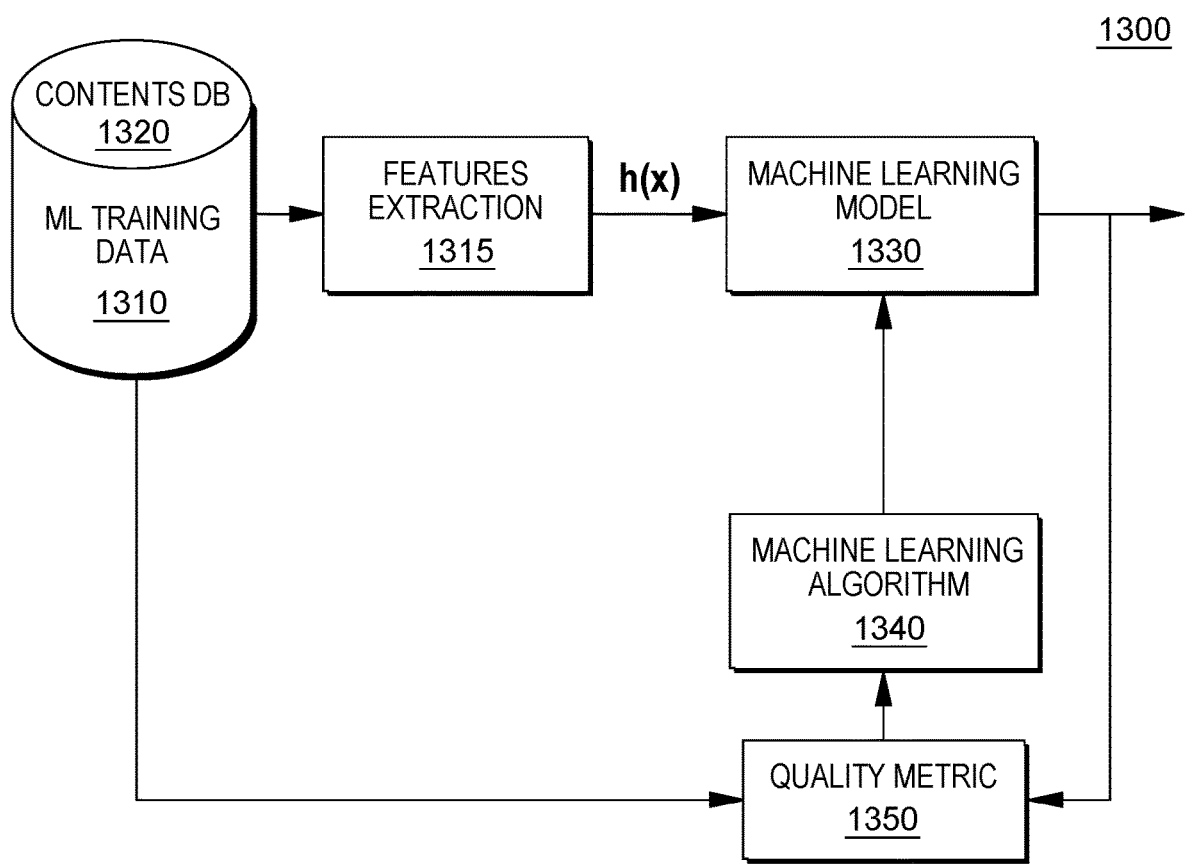
FIG. 13 depicts one example of using machine learning in one or more aspects of the present invention.

FIG. 13 is an example of a machine learning training system 1300 utilized, in one or more aspects, to perform cognitive analyses of various inputs, including gathered data, parameters and/or requirements. Training data utilized to train the model in one or more embodiments of the present invention includes, for instance, data that is specific to the recovery of a system. The program code in embodiments of the present invention performs a cognitive analysis to generate data structures, including algorithms utilized by the program code to make predictions, such as to predict solutions, performance impacts, etc. Machine learning (ML) solves problems that are not solved with numerical means alone. In this ML-based example, program code extracts various features/attributes/data from ML training data 1310 (e.g., information collected from various data sources relevant to the failure, solutions, received inputs and/or requirements), which may be resident in one or more databases 1320. Features extraction 1315 is utilized to develop a predictor function, h(x), also referred to as a hypothesis, which the program code utilizes as a machine learning model 1330.

In identifying various states and/or behaviors indicative of states in the ML training data 1310, the program code can utilize various techniques including, but not limited to, mutual information, which is an example of a technique that can be utilized to identify features (e.g., elements, patterns, attributes, etc.). Further, varying techniques may be used to select features, including but not limited to, diffusion mapping, principal component analysis, recursive feature elimination (an approach to selecting features), and/or a Random Forest, to select the attributes related to various subject states (e.g., training/test data). The program code may utilize a machine learning algorithm 1340 to train the machine learning model 1330 (e.g., the algorithms utilized by the program code), including providing weights for the conclusions, so that the program code can train the predictor functions that comprise the machine learning model 1330. The conclusions may be evaluated by a quality metric 1350. By selecting a diverse set of ML training data 1310, the program code trains the machine learning model 1330 to identify and weight various attributes (e.g., features, patterns, data) that correlate to various states of a subject (e.g., failures, solutions, the environment, etc.).

The model generated by the program code is self-learning as the program code updates the model based on active feedback received from subjects (e.g., the test advisor process, users, and/or the environment). For example, when the program code determines that there is material to be learned that was not previously predicted by the model, the program code utilizes a learning agent to update the model to reflect that information, in order to improve predictions in the future. Additionally, when the program code determines that a prediction is incorrect, either based on receiving user feedback through an interface or based on continuously monitoring the subject, the program code updates the model to reflect the inaccuracy of the prediction for the given period of time. Program code comprising a learning agent cognitively analyzes the data deviating from the modeled expectations and adjusts the model in order to increase the accuracy of the model, moving forward.

In one or more embodiments, program code executing on one or more processors, utilizes an existing cognitive analysis tool or agent to tune the model, based on data obtained from the various data sources. One or more embodiments utilize, for instance, the IBM Watson® system as the cognitive agent; however, other cognitive agents may be used. In one or more embodiments, the program code interfaces with, e.g., IBM Watson application programming interfaces (APIs) to perform a cognitive analysis of obtained data. Again, other cognitive agents and/or other program code interfaces of International Business Machines Corporation™ and/or of other companies may be used. IBM, IBM Watson, International Business Machines Corporation, Developer Cloud (mentioned below) and TrueNorth (mentioned below) are registered trademarks or trademarks of International Business Machines Corporation in at least one jurisdiction.

In one or more embodiments, the program code trains aspects of one or more IBM Watson application program interfaces to learn the material being taught. Utilizing an existing cognitive agent, such as the IBM Watson system, expands the type of subject data that the program code can integrate into the model. For example, data can include documentary, text, visual, and audio data, which the program code can process, based on its utilization of the IBM Watson system. Specifically, in one or more embodiments, certain of the application programming interfaces of the IBM Watson system comprise a cognitive agent (e.g., learning agent) that includes one or more programs, including, but not limited to, natural language classifiers, a retrieve and rank or discovery service (i.e., one or more services available through the IBM Watson® Developer Cloud™ (or others) that can surface the most relevant information from a collection of documents), concepts/visual insights, trade off analytics, document conversion, and/or relationship extraction. In an embodiment, one or more programs analyze the data obtained by the program code across various sources utilizing one or more of a natural language classifier, retrieve and rank application programming interfaces, and trade off analytics application programming interfaces. The IBM Watson application program interfaces can also provide audio related application programing interface services, in the event that the collected data includes audio, which can be utilized by the program code, including but not limited to natural language processing, text to speech capabilities, and/or translation.

In one or more embodiments, the program code utilizes a neural network to analyze the collected, learned and/or generated data to generate the model utilized for training and/or evaluation. Neural networks are a biologically-inspired programming paradigm which enable a computer to learn from observational data, learned data, generated data, and/or other data. This learning is referred to as deep learning, which is a set of techniques for learning in neural networks. Neural networks, including modular neural networks, are capable of pattern (e.g., state) recognition with speed, accuracy, and efficiency, in situations where data sets are multiple and expansive, including across a distributed network, including but not limited to, cloud computing systems. Modern neural networks are non-linear statistical data modeling tools. They are usually used to model complex relationships between inputs and outputs or to identify patterns (e.g., states) in data (i.e., neural networks are non-linear statistical data modeling or decision-making tools). In general, program code utilizing neural networks can model complex relationships between inputs and outputs and identify patterns in data and to generate conversation and/or evaluate such conversation. Because of the speed and efficiency of neural networks, especially when parsing multiple complex data sets, neural networks and deep learning provide solutions to many problems in multiple source processing, which the program code in one or more embodiments accomplishes when obtaining data and generating a model for evaluation and/or training of artificial intelligence-based processes.

One or more embodiments may utilize a neural network to predict future states of a given subject (e.g., predict future performance). Utilizing the neural network, the program code can predict the likelihood of the given state at a subsequent time. The program code obtains (or derives) data related to the subject and/or content being learned from various sources to generate an array of values (possible states) to input into input neurons of the neural network. Responsive to these inputs, the output neurons of the neural network produce an array that includes the predicted states. The program code can automatically transmit notifications related to the predicted states based on the perceived validity.

In one or more embodiments, a neuromorphic processor or trained neuromorphic chip can be incorporated into the computing resources executing the program code. One example of a trained neuromorphic chip that is utilized in an embodiment of the present invention is the IBM® TrueNorth™ chip, produced by International Business Machines Corporation. Other trained neuromorphic chips produced by International Business Machines Corporation and/or other companies may be used.

The IBM TrueNorth chip, also referred to as TrueNorth, is a neuromorphic complementary metal-oxide-semiconductor (CMOS) chip. TrueNorth includes a manycore network on a chip design (e.g., 4096 cores), each one simulating programmable silicon "neurons" (e.g., 256 programs) for a total of just over a million neurons. In turn, each neuron has, e.g., 256 programmable synapses that convey the signals between them. Hence, the total number of programmable synapses is just over, e.g., 268 million ($2^{28}$). Memory, computation, and communication are handled in each of the neurosynaptic cores, so TrueNorth circumvents the von-Neumann-architecture bottlenecks and is very energy-efficient.

One or more aspects of the present invention are inextricably tied to computing and improve processing within a computing environment. By providing and using a test advisor facility, performance of a failure recovery process is expedited and/or improved, improving processing within a computing environment.

Further example embodiments of computing environments to implement one or more aspects of the present invention are described below with reference to FIGS. 14-16.

Figure 14:
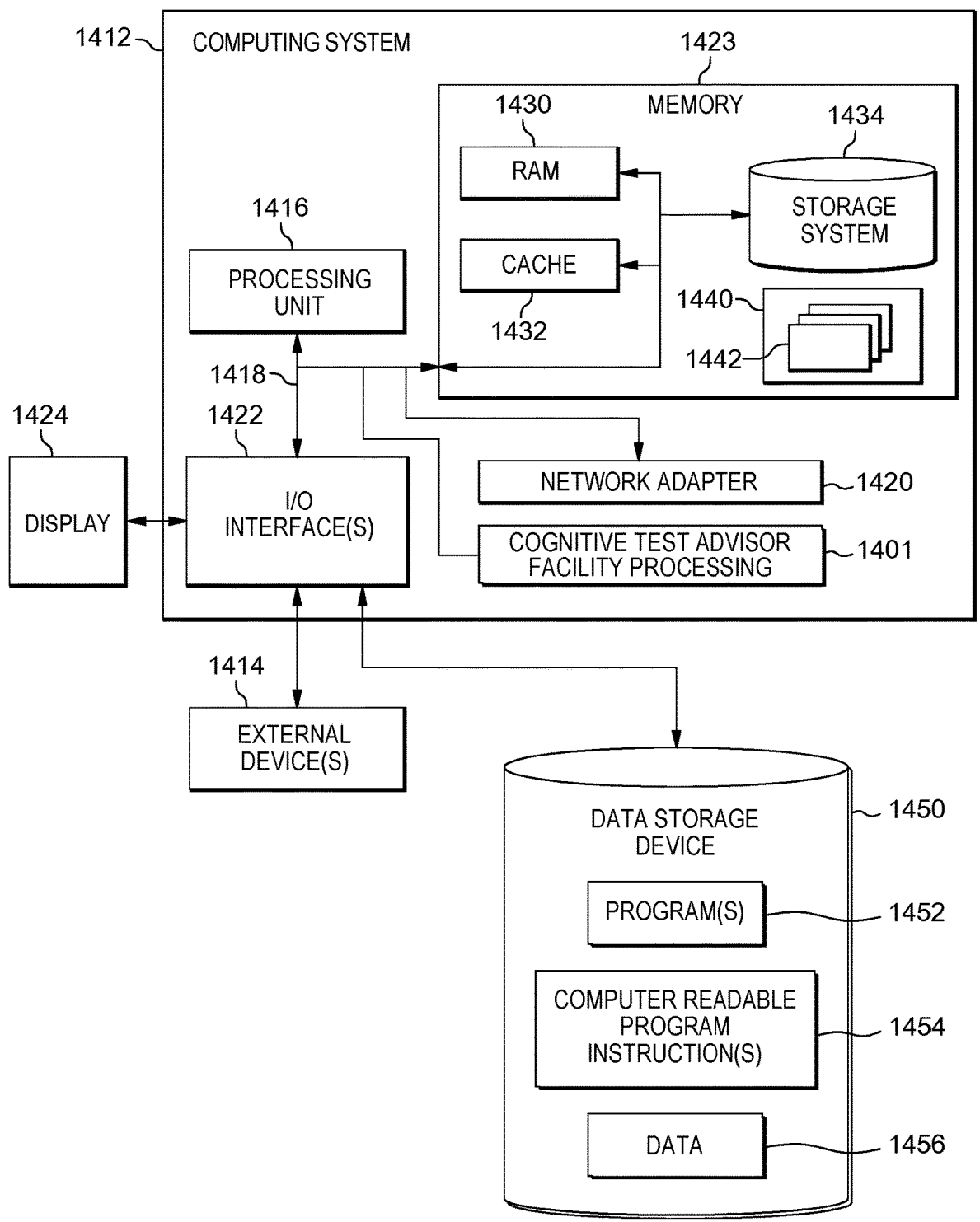
FIG. 14 depicts one embodiment of a computing system which can implement or facilitate implementing cognitive test advisor facility processing, in accordance with one or more aspects of the present invention.

By way of further example, FIG. 14 depicts one embodiment of a computing environment 1400, which includes a computing system 1412. Examples of well-known computing systems, environments, and/or configurations that may be suitable for use with computing system 1412 include, but are not limited to, a server, a desktop computer, a work station, a wireless computer, a handheld or laptop computer or device, a mobile phone, a programmable consumer electronic device, a tablet, a personal digital assistant (PDA), and the like.

Computing system 1412 can be described in the general context of computer system-executable instructions, such as program modules, being executed by a computing system. Generally, program modules include routines, programs, objects, components, logic, data structures, and so on that perform particular tasks or implement particular abstract data types.

As depicted in FIG. 14, computing system 1412, is shown in the form of a general-purpose computing device. The components of computing system 1412 can include, but are not limited to, one or more processors or processing units 1416, a system memory 1423, and a bus 1418 that couples various system components including system memory 1423 to processor 1416.

In one embodiment, processor 1416 may be based on the z/Architecture® hardware architecture offered by International Business Machines Corporation, or other architectures offered by International Business Machines Corporation or other companies.

Bus 1418 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computing system 1412 can include a variety of computer system readable media. Such media may be any available media that is accessible by computing system 1412, and it includes both volatile and non-volatile media, removable and non-removable media.

System memory 1423 can include computer system readable media in the form of volatile memory, such as random access memory (RAM) 1430 and/or cache memory 1432. Computing system 1412 can further include other removable/non-removable, volatile/non-volatile computer system storage media. By way of example only, storage system 1434 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media could be provided. In such instances, each can be connected to bus 1418 by one or more data media interfaces. As described below, memory 1423 can include at least one program product having a set (e.g., at least one) of program modules or code that are configured to carry out the functions of embodiments of the invention.

Program/utility 1440, having a set (at least one) of program modules 1442, can be stored in memory 1423 by way of example, and not limitation, as well as an operating system, one or more application programs, other program modules, and program data. Each of the operating system, one or more application programs, other program modules, and program data or some combination thereof, can include an implementation of a networking environment. Program modules 1442 generally carry out the functions and/or methodologies of embodiments of the invention as described herein. Further, a facility, tool, module, logic, system, etc., 1401 can be provided within computing environment 1412 implementing cognitive test advisor facility processing, as disclosed herein.

Computing system 1412 can also communicate with one or more external devices 1414 such as a keyboard, a pointing device, a display 1424, etc.; one or more devices that enable a user to interact with computing system 1412; and/or any devices (e.g., network card, modem, etc.) that enable computing system 1412 to communicate with one or more other computing devices. One particular external device 1414 is a data storage device 1450 that includes, for instance, programs 1452; computer readable program instructions 1454 that may be used to implement one or more aspects of the present invention; and/or data 1456.

Communication can occur via Input/Output (I/O) interfaces 1422. Still yet, computing system 1412 can communicate with one or more networks such as a local area network (LAN), a general wide area network (WAN), and/or a public network (e.g., the Internet) via network adapter 1420. As depicted, network adapter 1420 communicates with the other components of computing system 1412, via bus 1418. It should be understood that although not shown, other hardware and/or software components could be used in conjunction with computing system 1412. Examples, include, but are not limited to: microcode, device drivers, redundant processing units, external disk drive arrays, RAID systems, tape drives, and data archival storage systems, etc.

One or more aspects may relate to cloud computing.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 15:
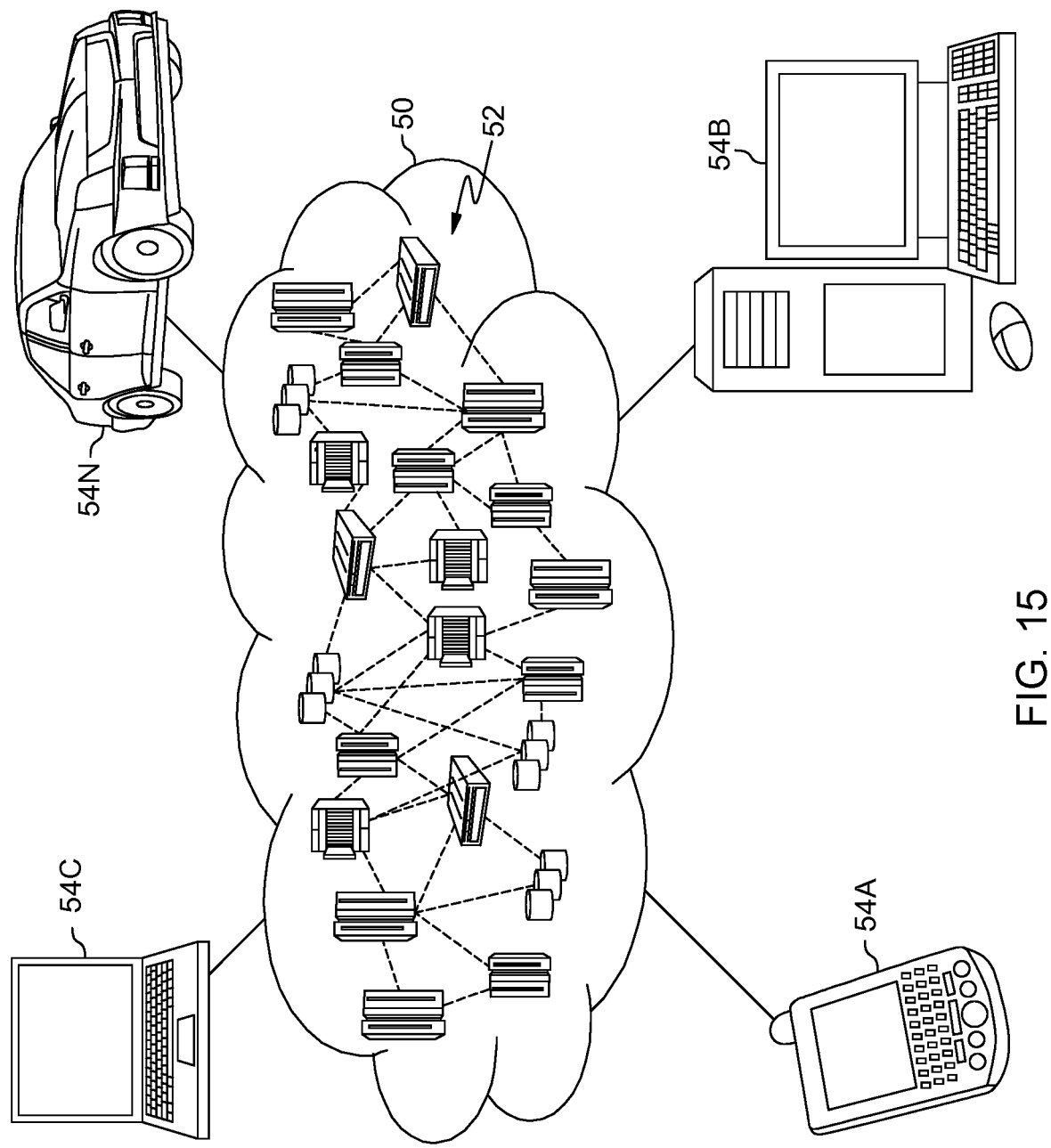
FIG. 15 depicts one embodiment of a cloud computing environment which can facilitate implementing, or be used in association with, one or more aspects of the present invention.

Referring now to FIG. 15, illustrative cloud computing environment 50 is depicted. As shown, cloud computing environment 50 includes one or more cloud computing nodes 52 with which local computing devices used by cloud consumers, such as, for example, personal digital assistant (PDA) or cellular telephone 54A, desktop computer 54B, laptop computer 54C, and/or automobile computer system 54N may communicate. Nodes 52 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 15 are intended to be illustrative only and that computing nodes 52 and cloud computing environment 50 can communicate with any type of computerized device over any type of network and/or network addressable connection (e.g., using a web browser).

Figure 16:
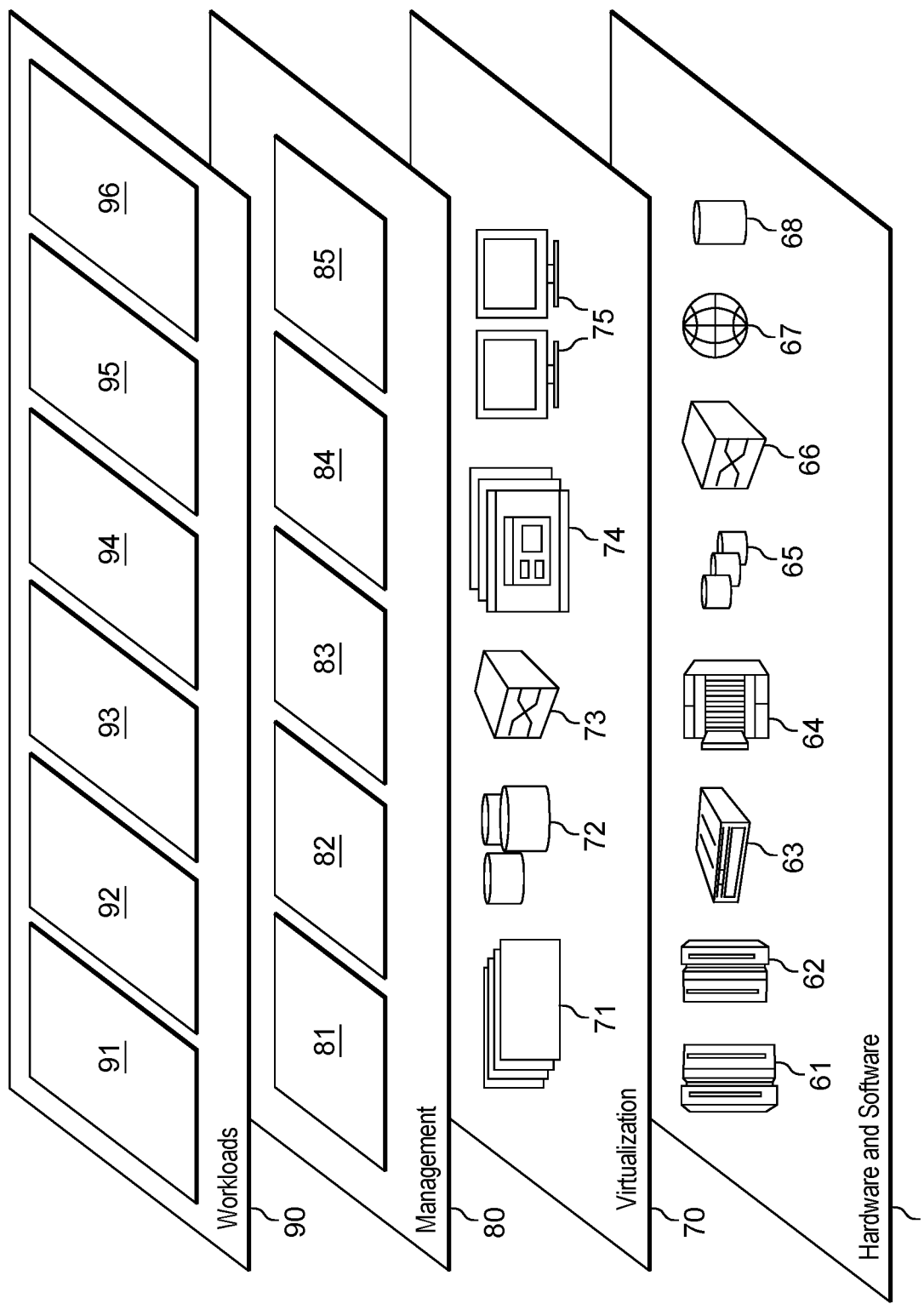
FIG. 16 depicts an example of abstraction model layers, which can facilitate implementing cognitive test advisor facility processing, in accordance with one or more aspects of the present invention.

Referring now to FIG. 16, a set of functional abstraction layers provided by cloud computing environment 50 (FIG. 15) is shown. It should be understood in advance that the components, layers, and functions shown in FIG. 16 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and test advisor processing 96.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Aspects of the present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally, or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, other machine learning techniques may be used. Further, other types of failures, recoveries, tasks, agents, etc. may be used. Many variations are possible.

Various aspects are described herein. Further, many variations are possible without departing from a spirit of aspects of the present invention. It should be noted that, unless otherwise inconsistent, each aspect or feature described herein, and variants thereof, may be combinable with any other aspect or feature.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method comprising:
obtaining, by a testing system based on a failure of a system, an indication of one or more tasks to be performed, the testing system comprising a processor;
automatically determining by the testing system whether a user is to perform one or more actions to alter execution of the one or more tasks, the automatically determining being based on whether a knowledge transfer score of the user meets at least one predefined criterion;
performing the one or more actions, based on the knowledge transfer score meeting the at least one predefined criterion; and
training a training dataset, the training the training dataset comprising including in the training dataset an indication of the one or more actions, based on automatically determining that the user is to perform the one or more actions.

2. The computer-implemented method of claim 1, further comprising providing an indication that the user is not to perform the one or more actions, based on the knowledge transfer score failing to meet the at least one predefined criterion.

3. The computer-implemented method of claim 1, wherein the one or more actions comprises modifying an activity sequence of the one or more tasks.

4. The computer-implemented method of claim 1, wherein the one or more actions comprises altering a selection of a task performing agent to perform at least one task of the one or more tasks.

5. The computer-implemented method of claim 1, wherein the one or more actions comprise modifying an activity sequence of the one or more tasks and altering a selection of one or more task performing agents to perform the one or more tasks.

6. The computer-implemented method of claim 1, wherein the at least one predefined criterion includes the knowledge transfer score having a predefined relationship with respect to a selected knowledge transfer threshold.

7. The computer-implemented method of claim 6, wherein the predefined relationship comprises the knowledge transfer score being less than or equal to the selected knowledge transfer threshold.

8. The computer-implemented method of claim 6, wherein the selected knowledge transfer threshold corresponds to an action of the one or more actions to be performed, wherein there are one or more knowledge transfer thresholds for the one or more actions.

9. The computer implemented method of claim 1, wherein the automatically determining comprises determining the knowledge transfer score, the determining the knowledge transfer score using one or more equations, the one or more equations comprising:

$$\text{Knowledge Transfer Score} = F1 - \frac{\sum_{i=1}^{I} K_i \times w_i \times D_i}{I},$$

$$F1 = 2 \times \frac{1}{\frac{1}{P} + \frac{1}{R}} \times 100;$$

and
wherein P is a number of correct positive results divided by a number of positive results predicted, R is the number of correct positive results divided by a number of samples that should have been identified as positive, $K_i$ determines whether a parameter is relevant, $D_i$ is a normalized detractor parameters score, I is a total number of parameters and $w_i$ is an importance of a detractor parameter.

10. A computer system comprising:
a memory; and
at least one processor in communication with the memory, wherein the computer system is configured to perform a method, said method comprising:
  obtaining, by a testing system based on a failure of a system, an indication of one or more tasks to be performed, the testing system comprising a processor;
  automatically determining by the testing system whether a user is to perform one or more actions to alter execution of the one or more tasks, the automatically determining being based on whether a knowledge transfer score of the user meets at least one predefined criterion;
  performing the one or more actions, based on the knowledge transfer score meeting the at least one predefined criterion; and
  training a training dataset, the training the training dataset comprising including in the training dataset an indication of the one or more actions, based on automatically determining that the user is to perform the one or more actions.

11. The computer system of claim 10, wherein the one or more actions comprises modifying an activity sequence of the one or more tasks.

12. The computer system of claim 10, wherein the one or more actions comprises altering a selection of a task performing agent to perform at least one task of the one or more tasks.

13. The computer system of claim 10, wherein the at least one predefined criterion includes the knowledge transfer score having a predefined relationship with respect to a selected knowledge transfer threshold.

14. The computer system of claim 13, wherein the selected knowledge transfer threshold corresponds to an action of the one or more actions to be performed, wherein there are one or more knowledge transfer thresholds for the one or more actions.

15. A computer program product comprising:
one or more computer readable storage media and program instructions collectively stored on the one or more computer readable storage media to perform a method comprising:
  obtaining, by a testing system based on a failure of a system, an indication of one or more tasks to be performed, the testing system comprising a processor;
  automatically determining by the testing system whether a user is to perform one or more actions to alter execution of the one or more tasks, the automatically determining being based on whether a knowledge transfer score of the user meets at least one predefined criterion;
  performing the one or more actions, based on the knowledge transfer score meeting the at least one predefined criterion; and
  training a training dataset, the training the training dataset comprising including in the training dataset an indication of the one or more actions, based on automatically determining that the user is to perform the one or more actions.

16. The computer program product of claim 15, wherein the one or more actions comprises modifying an activity sequence of the one or more tasks.

17. The computer program product of claim 15, wherein the one or more actions comprises altering a selection of a task performing agent to perform at least one task of the one or more tasks.

18. The computer program product of claim 15, wherein the at least one predefined criterion includes the knowledge transfer score having a predefined relationship with respect to a selected knowledge transfer threshold.

19. The computer program product of claim 18, wherein the selected knowledge transfer threshold corresponds to an action of the one or more actions to be performed, wherein there are one or more knowledge transfer thresholds for the one or more actions.

20. The computer system of claim 10, wherein the automatically determining comprises determining the knowledge transfer score, the determining the knowledge transfer score using one or more equations, the one or more equations comprising:

$$\text{Knowledge Transfer Score} = F1 - \frac{\sum_{i=1}^{I} K_i \times w_i \times D_i}{I};$$

$$F1 = 2 \times \frac{1}{\frac{1}{P} + \frac{1}{R}} \times 100;$$

and
wherein P is a number of correct positive results divided by a number of positive results predicted, R is the number of correct positive results divided by a number of samples that should have been identified as positive, $K_i$ determines whether a parameter is relevant, $D_i$ is a normalized detractor parameters score, I is a total number of parameters and $w_i$ is an importance of a detractor parameter.

* * * * *